US012563507B2

(12) United States Patent
Cha et al.

(10) Patent No.: US 12,563,507 B2
(45) Date of Patent: Feb. 24, 2026

(54) ELECTRONIC DEVICE PERFORMING BACK-OFF AND METHOD FOR OPERATING THE SAME

(71) Applicant: SAMSUNG ELECTRONICS CO., LTD., Suwon-si (KR)

(72) Inventors: Jaemoon Cha, Suwon-si (KR); Seyeon Lee, Suwon-si (KR); Kyujae Jang, Suwon-si (KR); Minhwan Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 364 days.

(21) Appl. No.: 18/310,759

(22) Filed: May 2, 2023

(65) Prior Publication Data

US 2023/0397132 A1     Dec. 7, 2023

Related U.S. Application Data

(63) Continuation of application No. PCT/KR2023/005570, filed on Apr. 24, 2023.

(30) Foreign Application Priority Data

Jun. 3, 2022     (KR) ........................ 10-2022-0068368
Jun. 28, 2022     (KR) ........................ 10-2022-0079190

(51) Int. Cl.
  *H04W 52/38*     (2009.01)
  *H04W 52/36*     (2009.01)
  *H04W 88/06*     (2009.01)

(52) U.S. Cl.
  CPC ........... *H04W 52/38* (2013.01); *H04W 52/36* (2013.01); *H04W 88/06* (2013.01)

(58) Field of Classification Search
  CPC ..... H04W 52/38; H04W 52/36; H04W 88/06; H04W 52/386; H04W 52/367
  See application file for complete search history.

(56) References Cited

U.S. PATENT DOCUMENTS 10,939,387 B2 *   3/2021   Jadhav ................ H04W 52/367
11,191,032 B2   11/2021   Cho et al.
(Continued)

FOREIGN PATENT DOCUMENTS

CN          113472397          10/2021
KR      20130076994 A         7/2013
(Continued)

OTHER PUBLICATIONS

Extended European Search Report dated Apr. 22, 2025 issued in European Patent Application No. 23816224.2.
(Continued)

*Primary Examiner* — John J Lee
(74) *Attorney, Agent, or Firm* — NIXON & VANDERHYE P.C.

(57)     ABSTRACT

According to various embodiments, an electronic device may comprise: an RF circuit configured for cellular data communication, a plurality of antennas connected to the RF circuit, a Wi-Fi module comprising Wi-Fi circuitry, and at least one processor. The at least one processor may be configured to provide a first indication indicating activation of cellular data communication based on a first antenna among the plurality of antennas being used for transmission. A distance between the first antenna and a Wi-Fi antenna corresponding to the Wi-Fi module may be equal to or less than a first value. The Wi-Fi module may be configured to perform a back-off operation on transmission power of a Wi-Fi RF signal based on reception of the first indication. The at least one processor may be further configured to refrain from providing the first indication, based on a second (Continued)

antenna from which distance to the Wi-Fi antenna exceeds the first value among the plurality of antennas being used for transmission.

22 Claims, 33 Drawing Sheets

(56)                    References Cited

U.S. PATENT DOCUMENTS

| | | |
|---|---|---|
| 2010/0046479 A1 | 2/2010 | Sampath et al. |
| 2013/0272260 A1 | 10/2013 | Bitran et al. |
| 2018/0151952 A1 | 5/2018 | Oh |
| 2019/0165824 A1 | 5/2019 | Mohamed et al. |
| 2019/0356349 A1 | 11/2019 | Lan et al. |
| 2020/0107274 A1 | 4/2020 | Jadhav et al. |
| 2021/0135377 A1 | 5/2021 | Akashi |
| 2021/0258110 A1* | 8/2021 | Brahmi ................. H04L 1/1896 |
| 2021/0392622 A1 | 12/2021 | Zhang |
| 2022/0345557 A1 | 10/2022 | Lee et al. |
| 2023/0343200 A1* | 10/2023 | Carrigan ............. G06F 3/04847 |

FOREIGN PATENT DOCUMENTS

| | | |
|---|---|---|
| KR | 10-2019-0027865 | 3/2019 |
| KR | 10-2021-0011169 | 2/2021 |
| KR | 10-2348729 | 1/2022 |
| KR | 10-2022-0012705 | 2/2022 |
| WO | 2018/230091 | 12/2018 |
| WO | 2022/045647 | 3/2022 |

OTHER PUBLICATIONS

Search Report and Written Opinion dated Jul. 27, 2023 issued in International Patent Application No. PCT/KR2023/005570.

* cited by examiner

Figure 8B:
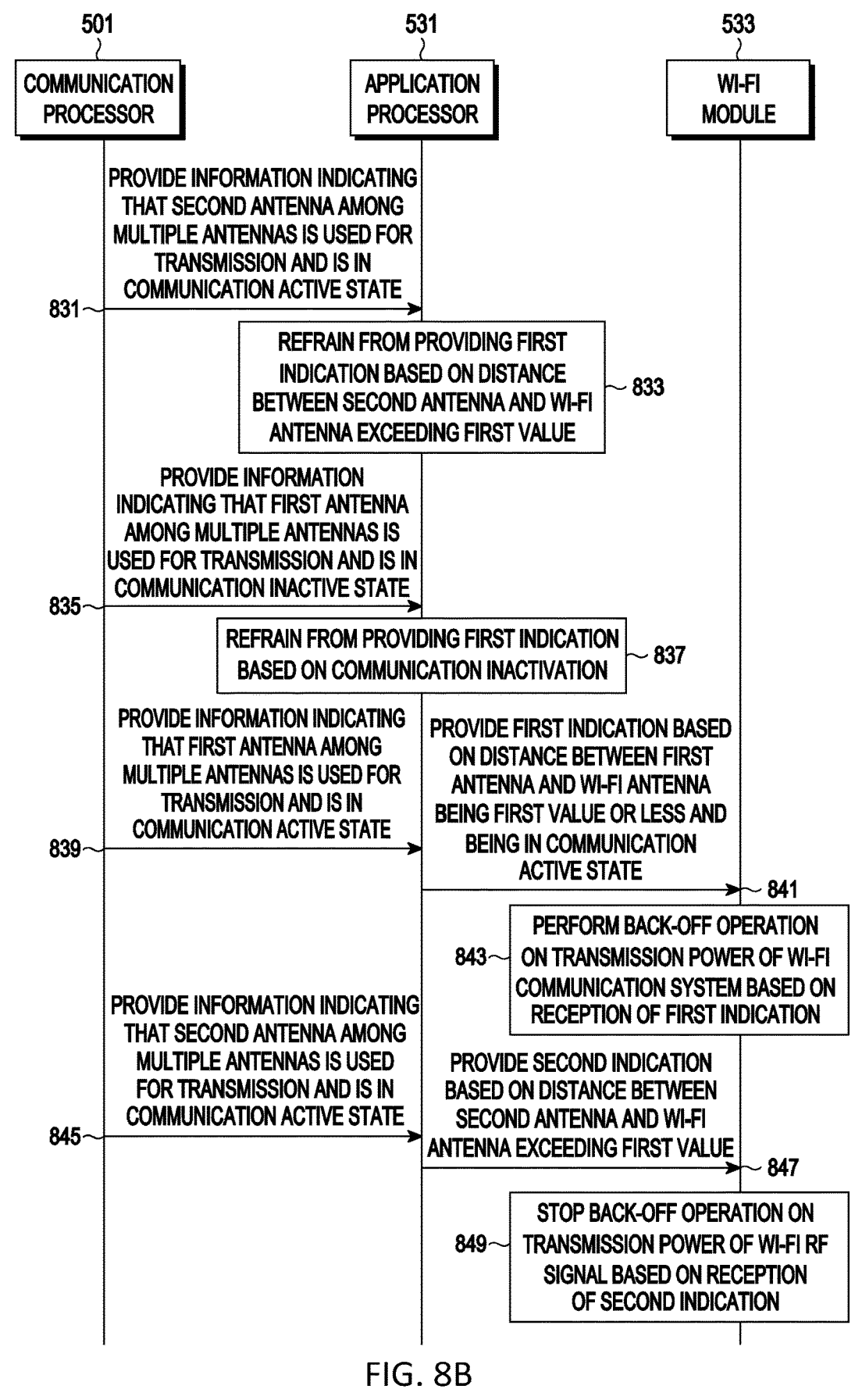

501

COMMUNICATION PROCESSOR

531

APPLICATION PROCESSOR

533

WI-FI MODULE

PROVIDE INFORMATION INDICATING THAT SECOND ANTENNA AMONG MULTIPLE ANTENNAS IS USED FOR TRANSMISSION AND IS IN COMMUNICATION ACTIVE STATE

831

REFRAIN FROM PROVIDING FIRST INDICATION BASED ON DISTANCE BETWEEN SECOND ANTENNA AND WI-FI ANTENNA EXCEEDING FIRST VALUE

833

PROVIDE INFORMATION INDICATING THAT FIRST ANTENNA AMONG MULTIPLE ANTENNAS IS USED FOR TRANSMISSION AND IS IN COMMUNICATION INACTIVE STATE

835

REFRAIN FROM PROVIDING FIRST INDICATION BASED ON COMMUNICATION INACTIVATION

837

PROVIDE INFORMATION INDICATING THAT FIRST ANTENNA AMONG MULTIPLE ANTENNAS IS USED FOR TRANSMISSION AND IS IN COMMUNICATION ACTIVE STATE

839

PROVIDE FIRST INDICATION BASED ON DISTANCE BETWEEN FIRST ANTENNA AND WI-FI ANTENNA BEING FIRST VALUE OR LESS AND BEING IN COMMUNICATION ACTIVE STATE

841

PERFORM BACK-OFF OPERATION ON TRANSMISSION POWER OF WI-FI COMMUNICATION SYSTEM BASED ON RECEPTION OF FIRST INDICATION

843

PROVIDE INFORMATION INDICATING THAT SECOND ANTENNA AMONG MULTIPLE ANTENNAS IS USED FOR TRANSMISSION AND IS IN COMMUNICATION ACTIVE STATE

845

PROVIDE SECOND INDICATION BASED ON DISTANCE BETWEEN SECOND ANTENNA AND WI-FI ANTENNA EXCEEDING FIRST VALUE

847

STOP BACK-OFF OPERATION ON TRANSMISSION POWER OF WI-FI RF SIGNAL BASED ON RECEPTION OF SECOND INDICATION

ELECTRONIC DEVICE PERFORMING BACK-OFF AND METHOD FOR OPERATING THE SAME

CROSS-REFERENCE TO RELATED APPLICATIONS

This application is a continuation of International Application No. PCT/KR2023/005570 designating the United States, filed on Apr. 24, 2023, in the Korean Intellectual Property Receiving Office and claiming priority to Korean Patent Application No. 10-2022-0068368, filed on Jun. 3, 2022, in the Korean Intellectual Property Office, and to Korean Patent Application No. 10-2022-0079190, filed on Jun. 28, 2022, in the Korean Intellectual Property Office, the disclosures of all of which are incorporated by reference herein in their entireties.

BACKGROUND

Field

The disclosure relates to an electronic device performing back-off associated with the transmission power of an RF signal and a method for operating the same.

Description of Related Art

A user equipment (UE) may transmit electromagnetic waves to transmit/receive data to/from a base station. Electromagnetic waves radiated from the UE may harm the human body, and various domestic or foreign organizations attempt to restrict the harmful electromagnetic waves. For example, the specific absorption rate (SAR) is a value indicating how much electromagnetic radiation from a mobile communication terminal is absorbed by the human body. SAR uses the unit of KW/g (or mW/g), which may refer to the amount of power (KW, W or mW) absorbed per 1 g of the human body. As the issue of harmfulness of electromagnetic waves attracts attention, SAR restriction standards for mobile communication terminals have been established.

The UE may back off the transmission power, the maximum transmission power level (MTPL), e.g., if the SAR expected by the transmission power is expected to exceed a threshold. For example, upon identifying that a specific event (e.g., a grip, hot-spot, or proximity) occurs, the UE may transmit an RF signal in the back-off power corresponding to the event or transmit an RF signal in the transmission power set based on the maximum transmission power level.

Further, there is also used technology of backing off the transmission power (or maximum transmission power level) based on the total SAR value accumulated for a predetermined time (or the average of the SARs generated for a predetermined time). The SAR that instantaneously affects the human body and/or the SAR that affects the human body on average should also be considered. Therefore, the transmission power (or maximum transmission power level) when the total SAR value accumulated (or the average of the SARs generated for a predetermined time) meets a designated condition may be backed off.

The UE may support Wi-Fi (e.g., IEEE 802.11 series, etc.) as well as cellular data communication. The UE may at least simultaneously transmit an uplink signal for cellular data communication and an uplink signal for Wi-Fi communication. Or, the UE may transmit an uplink signal for cellular data communication and/or an uplink signal for Wi-Fi communication in a time table for considering the average SAR. In the above cases, the sum of the SARs generated by both the uplink signals needs to meet the SAR rule. Accordingly, a back-off operation for at least one communication may be required to be performed.

SUMMARY

Embodiments of the disclosure provide an electronic device and method for operating the same that determine whether to perform back-off based on the distance between an antenna for cellular data communication and a Wi-Fi antenna.

According to various example embodiments, an electronic device may comprise: a radio frequency (RF) circuit configured for cellular data communication, a plurality of antennas connected to the RF circuit, a Wi-Fi module including Wi-Fi circuitry, and at least one processor. The at least one processor may be configured to: provide a first indication indicating activation of cellular data communication based on a first antenna among the plurality of antennas being used for transmission. A distance between the first antenna and a Wi-Fi antenna corresponding to the Wi-Fi module may be equal to or less than a first value. The Wi-Fi module may be configured to perform a back-off operation on transmission power of a Wi-Fi RF signal based on reception of the first indication. The at least one processor may be further configured to refrain from providing the first indication, based on a second antenna from which distance to the Wi-Fi antenna exceeds the first value among the plurality of antennas being used for transmission.

According to various example embodiments, a method for operating an electronic device may comprise: providing a first indication indicating activation of cellular data communication based on a first antenna among a plurality of antennas of the electronic device being used for transmission by at least one processor of the electronic device. A distance between the first antenna and a Wi-Fi antenna corresponding to the Wi-Fi module may be equal to or less than a first value. The method for operating the electronic device may comprise performing a back-off operation on transmission power of a Wi-Fi RF signal based on reception of the first indication by a Wi-Fi module of the electronic device. Providing the first indication may be refrained from, based on a second antenna from which distance to the Wi-Fi antenna exceeds the first value among the plurality of antennas being used for transmission.

According to various example embodiments, a non-transitory computer-readable storage medium storing executable program instructions that, when executed, enable an electronic device to perform operations comprising: providing a first indication indicating activation of cellular data communication based on a first antenna among a plurality of antennas of the electronic device being used for transmission by at least one processor of the electronic device. A distance between the first antenna and a Wi-Fi antenna corresponding to the Wi-Fi module may be equal to or less than a first value. The operations may comprise performing a back-off operation on transmission power of a Wi-Fi RF signal based on reception of the first indication. Providing the first indication may be refrained from, based on a second antenna from which distance to the Wi-Fi antenna exceeds the first value among the plurality of antennas being used for transmission.

According to various example embodiments, there may be provided an electronic device and method for operating the same which may determine whether to perform back-off based on the distance between an antenna for cellular data communication and a Wi-Fi antenna.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 8B is a signal flow diagram illustrating example operations of a communication processor, an application processor, and a Wi-Fi module according to various embodiments;

DETAILED DESCRIPTION

Figure 1:
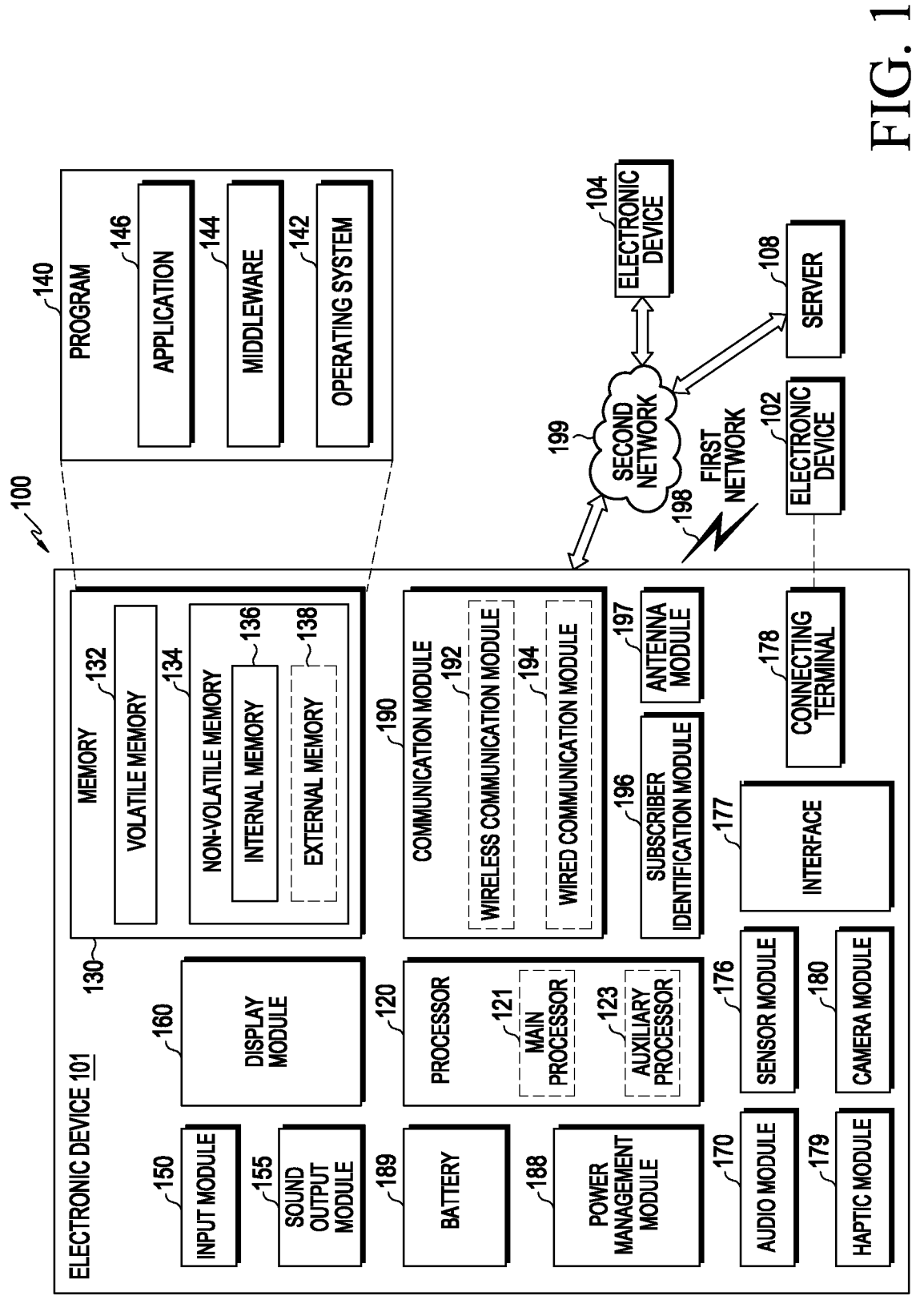
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
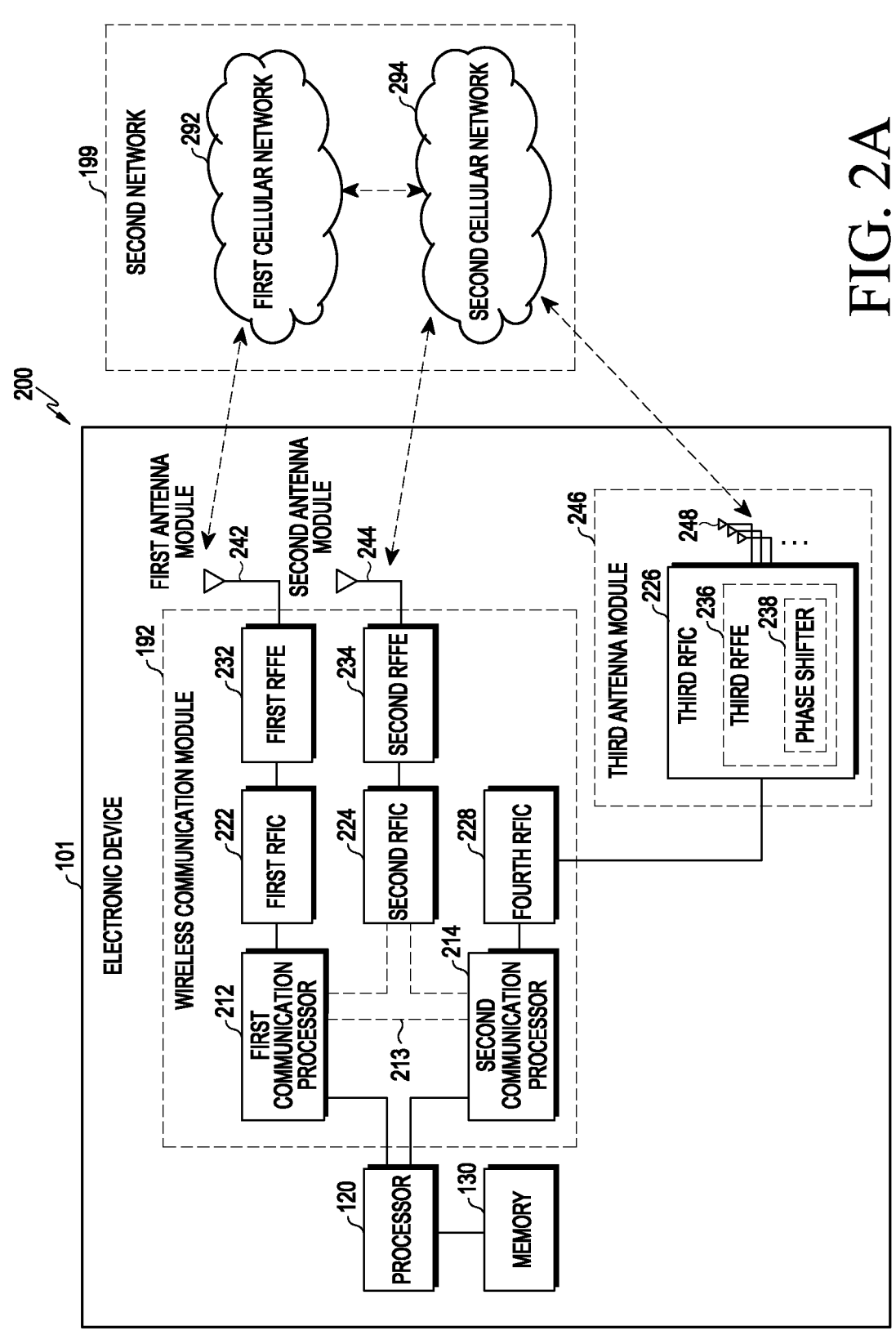
FIG. 2A is a block diagram illustrating an example configuration of an electronic device for supporting legacy network communication and 5G network communication according to various embodiments.

FIG. 2A is a block diagram 200 illustrating an example configuration of an electronic device 101 for supporting legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor (e.g., including processing circuitry) 120 and a memory 130. The second network 199 may include a first cellular network 292 and a second cellular network 294. According to an embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to an embodiment, the fourth RFIC 228 may be omitted or be included as part of the third RFIC 226.

The first communication processor 212 may include various processing circuitry and establish a communication channel of a band that is to be used for wireless communication with the first cellular network 292 or may support legacy network communication via the established communication channel According to various embodiments, the first cellular network may be a legacy network that includes second generation (2G), third generation (3G), fourth generation (4G), or long-term evolution (LTE) networks. The second CP 214 may include various processing circuitry and establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., a universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

Figure 2B:
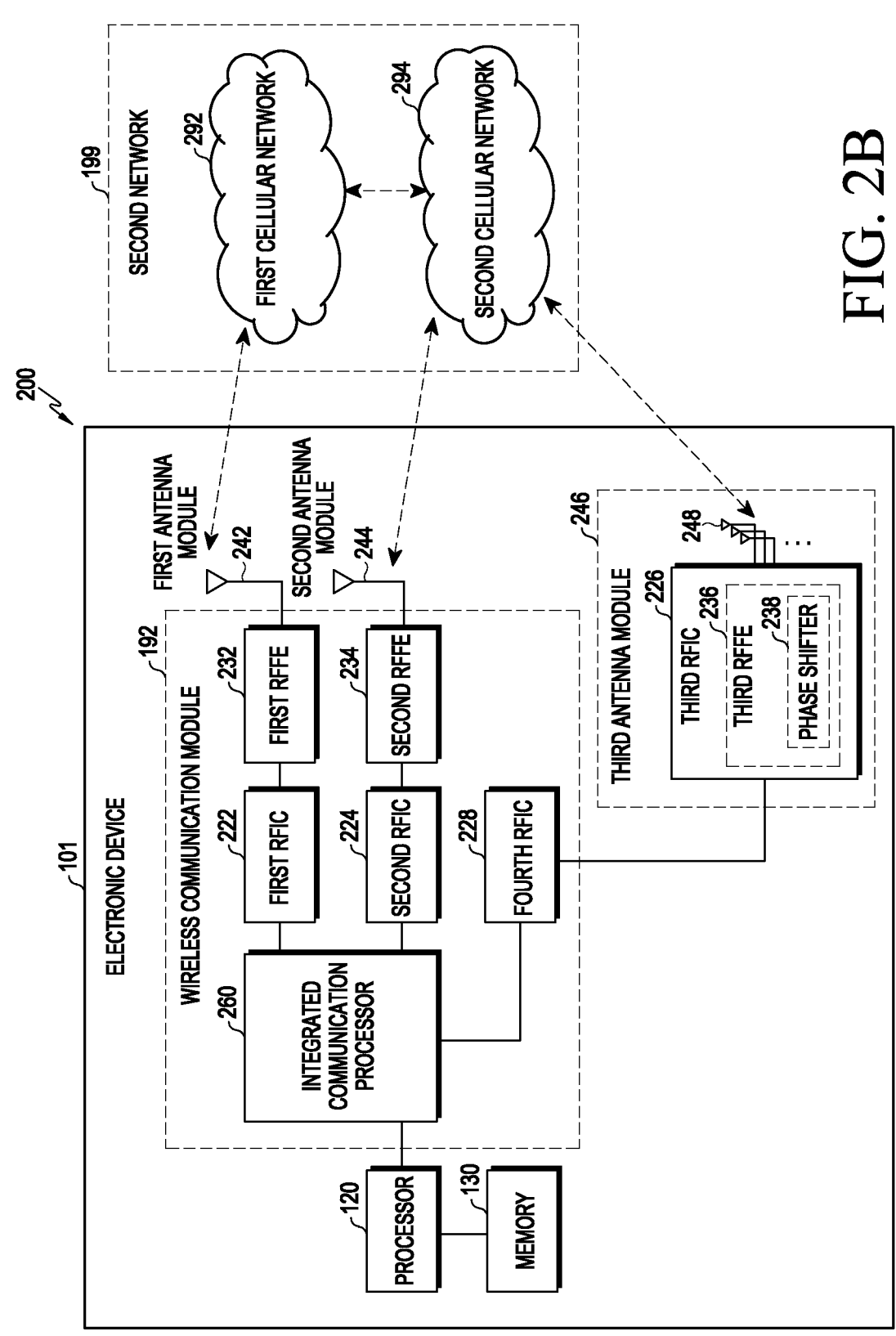
FIG. 2B is a block diagram illustrating an example configuration of an electronic device for supporting legacy network communication and 5G network communication according to various embodiments.

According to an embodiment, the first communication processor 212 and the second communication processor 214 may be implemented in a single chip or a single package. According to an embodiment, the first communication processor 212 or the second communication processor 214, along with the processor 120, an assistance processor 123, or communication module 190, may be formed in a single chip or single package. For example, as shown in FIG. 2B, an integrated communication processor 260 may include various processing circuitry and support all of the functions for communication with the first cellular network 292 and the second cellular network 294.

As described above, at least one of the processor 120, the first communication processor 212, the second communication processor 214, or the integrated communication processor 260 may be implemented as a single chip or a single package. In this case, the single chip or single package may include a memory (or storage means) storing instructions that cause at least some of operations performed according to various embodiments and a processing circuit (or operation circuit, but the term is not limited) for executing instructions.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third R1-1-E 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to various embodiments, when the first RFIC 222 and the second RFIC 224 in FIG. 2A or 2B are implemented as a single chip or a single package, they may be implemented as an integrated RFIC. In this case, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Figure 3A:
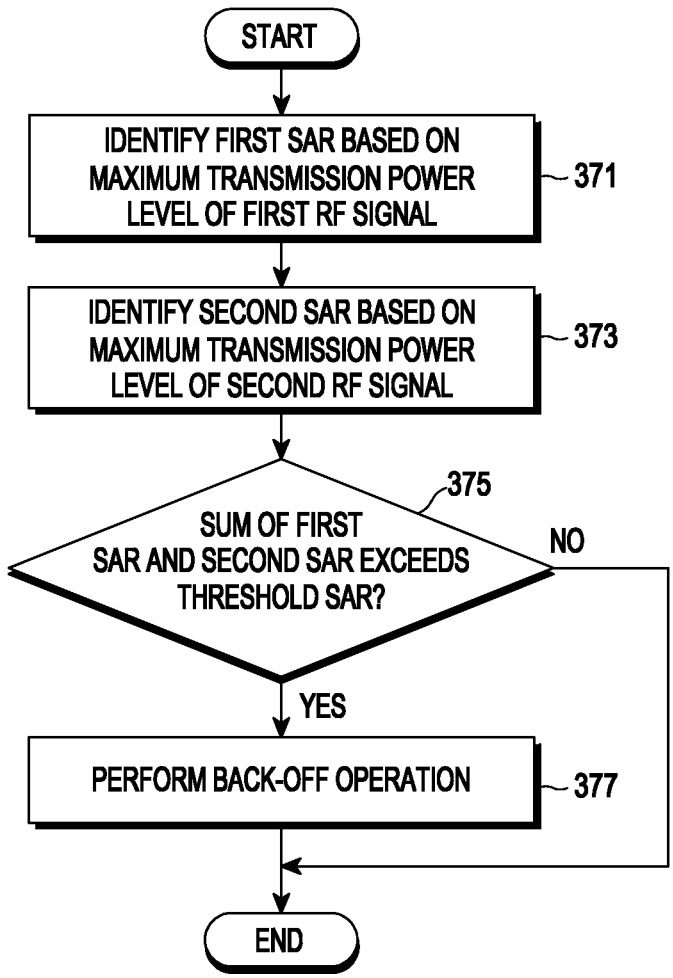
FIG. 3A is a flowchart illustrating an example method of operating an electronic device according to various embodiments.

FIG. 3A is a flowchart illustrating an example method of operating an electronic device according to various embodiments.

According to various embodiments, an electronic device 101 (e.g., at least one of the processor 120, the first communication processor 212, the second communication processor 214, or the integrated communication processor 260) may identify a first SAR based on the maximum transmission power level of a first RF signal in operation 371. In operation 373, the electronic device 101 may identify a second SAR based on the maximum transmission power level of a second RF signal. Meanwhile, it will be appreciated by one of ordinary skill in the art that that at least one of the first SAR and/or the second SAR may be replaced with power density (PD). The electronic device 101 may at least simultaneously transmit both the first RF signal and the second RF signal. In this case, whether the SAR rule is violated should be determined based on the sum of both the SARs. Accordingly, in operation 375, the electronic device 101 may identify whether the sum of the first SAR and the second SAR exceeds a threshold SAR. When the sum of the first SAR and the second SAR exceeds the threshold SAR (yes in 375), the electronic device 101 may perform a back-off operation in operation 377. The back-off operation may be, e.g., reducing the maximum transmission power level of the first RF signal and/or the maximum transmission power level of the second RF signal, but is not limited thereto. When the sum of the first SAR and the second SAR is the threshold SAR or less (no in 375), the electronic device 101 may not perform the back-off operation. As described above, the electronic device 101 may identify whether the sum of the SARs corresponding to both the RF signals exceeds the threshold SAR to determine whether the SAR rule is violated at one specific time.

For example, the electronic device 101 may at least simultaneously transmit an RF signal based on cellular data communication and an RF signal based on Wi-Fi communication. In this case, the electronic device 101 may perform back-off on the maximum transmission power level of the RF signal of Wi-Fi communication. For example, when 5G communication is activated, the maximum transmission power levels may be backed off in 16.29 dBm and 16.38 dBm, respectively, for two antennas for Wi-Fi communication based on IEEE 802.11b. Or, when 5G communication is activated, the maximum transmission power levels may be backed off in 13.19 dBm and 13.65 dBm, respectively, for the two antennas for Wi-Fi communication based on IEEE 802.11a. For example, when the Wi-Fi communication antenna relatively approaches the antenna for cellular data communication, the SAR restrictions may be observed by performing the back-off operation on Wi-Fi communication as described above. However, when the Wi-Fi communication antenna is disposed relatively far away from the antenna for cellular data communication, the need for performing the back-off operation on the Wi-Fi communication may be small. Accordingly, whether to perform back-off on Wi-Fi communication should be determined based on the distance between the Wi-Fi communication antenna and the antenna for cellular data communication, which is described below.

Figure 3B:
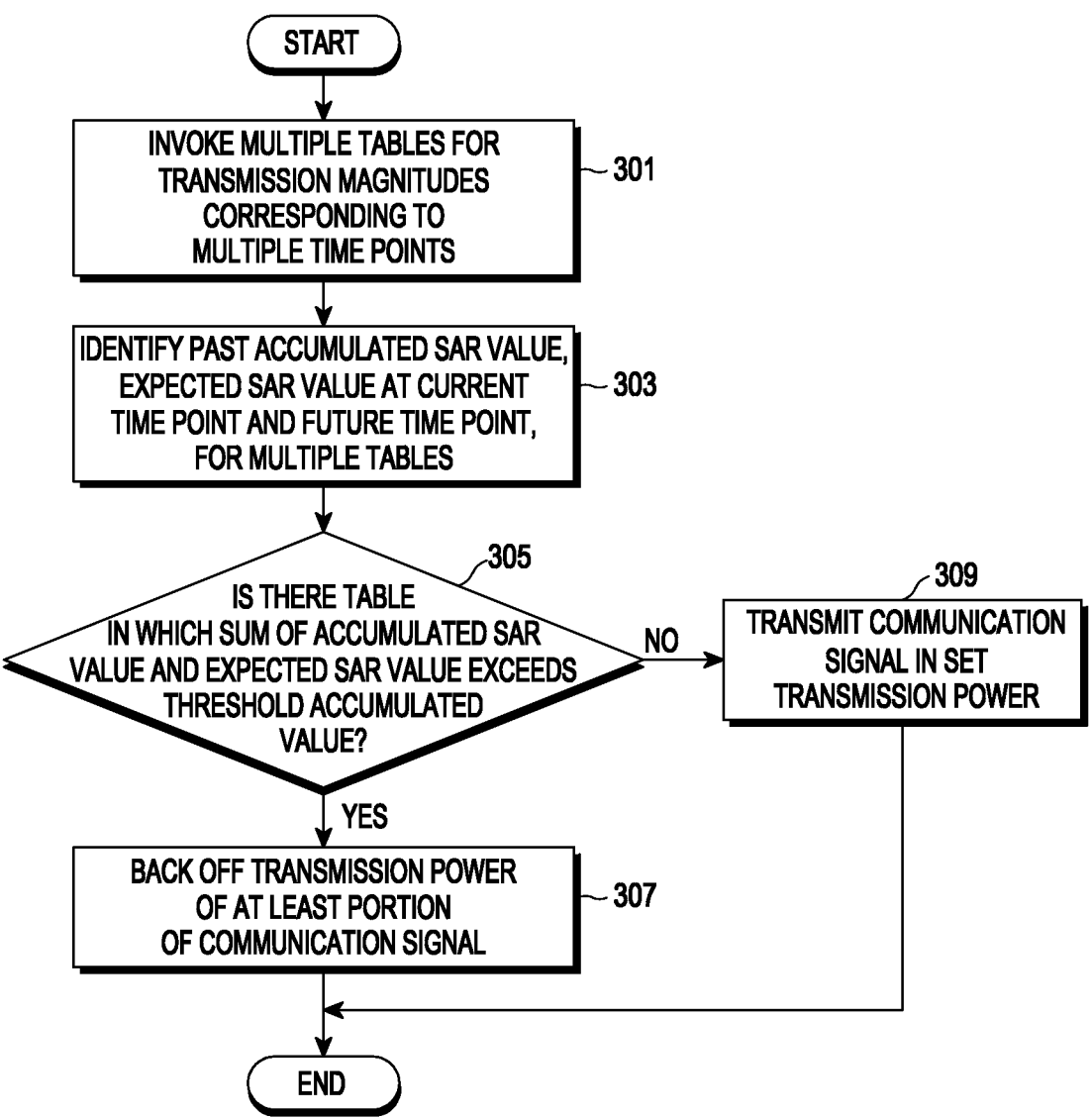
FIG. 3B is a flowchart illustrating an example method of operating an electronic device according to various embodiments.
Figure 3C:
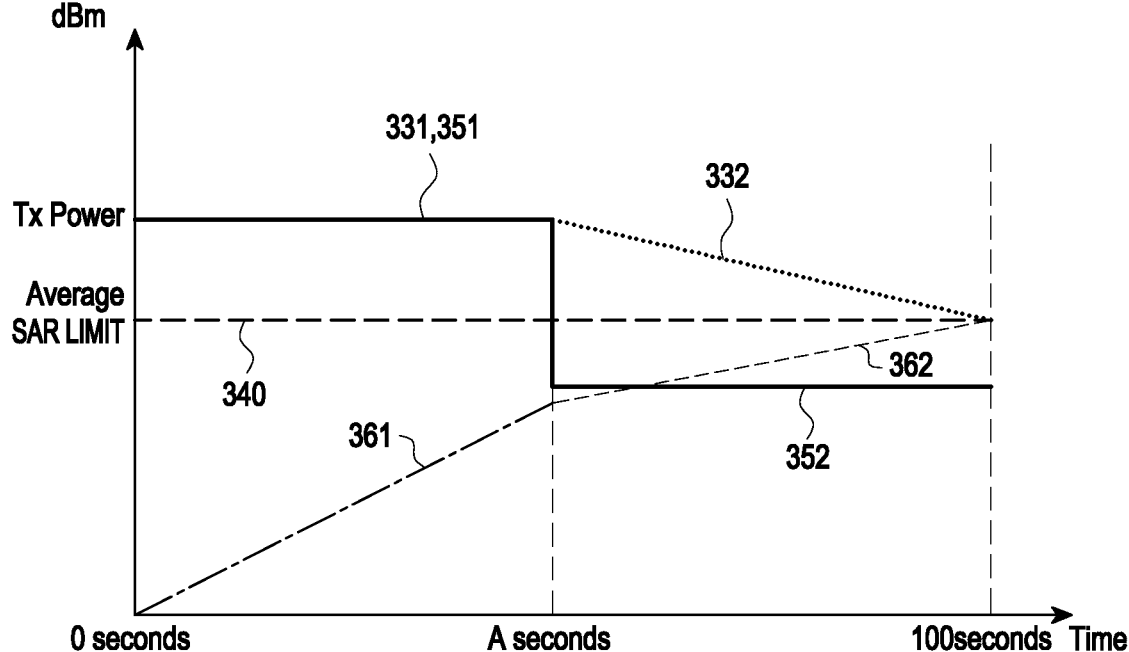
FIG. 3C is a graph illustrating transmission power and SAR over time according to various embodiments.
Figure 4A:
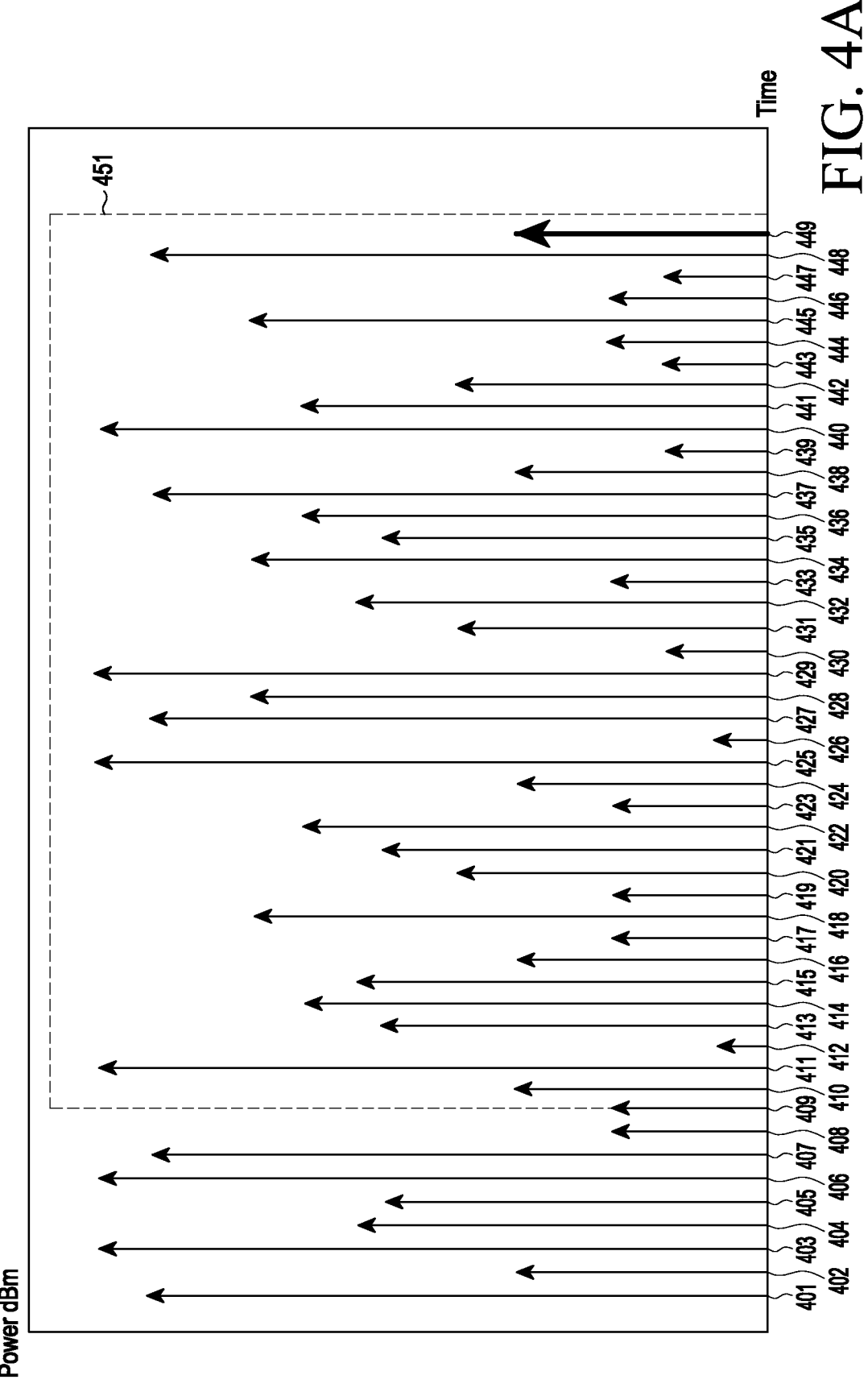
FIGS. 4A, 4B and 4C are graphs illustrating transmission power per time according to various embodiments.
Figure 4B:
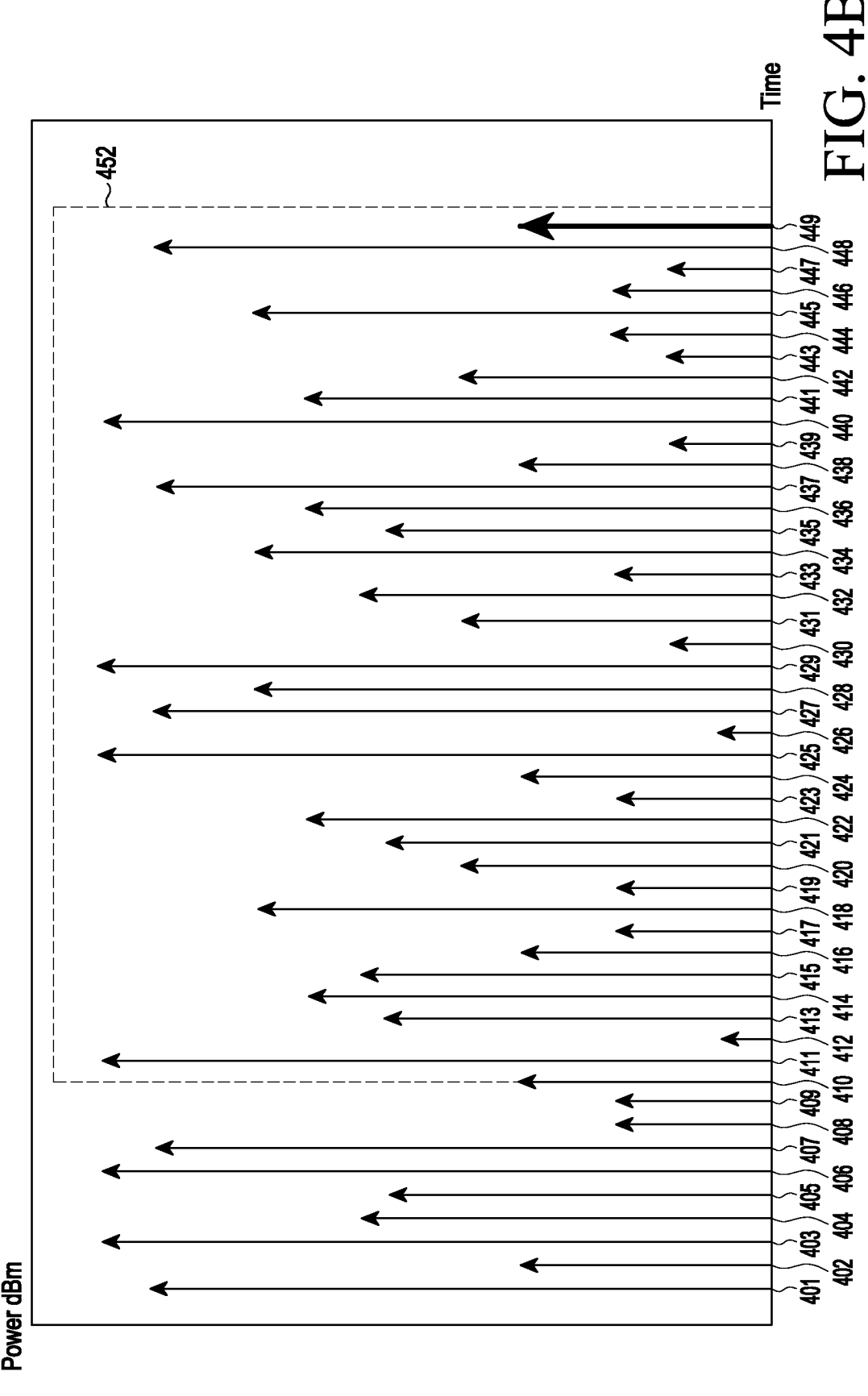
Figure 4C:
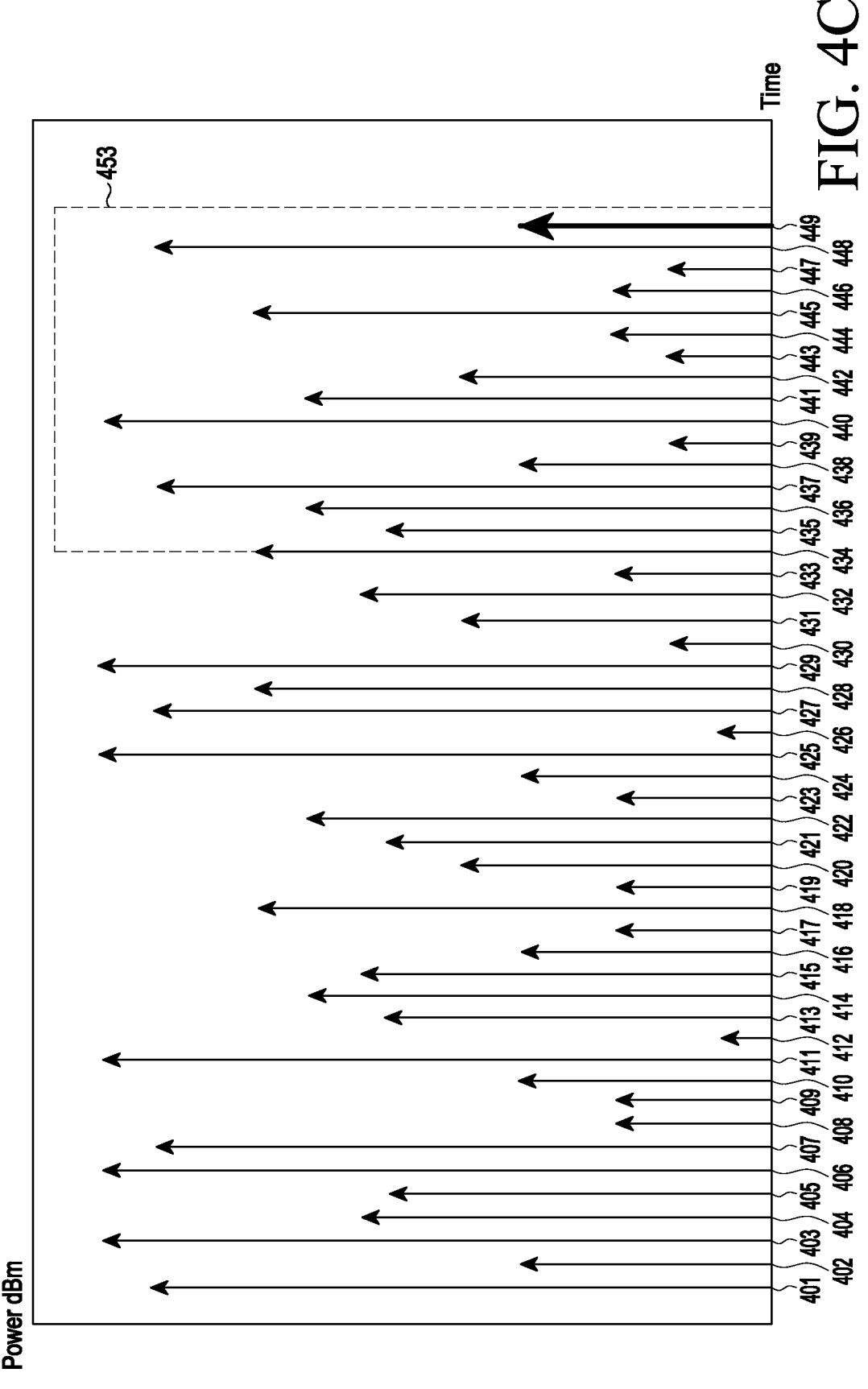
Figure 4D:
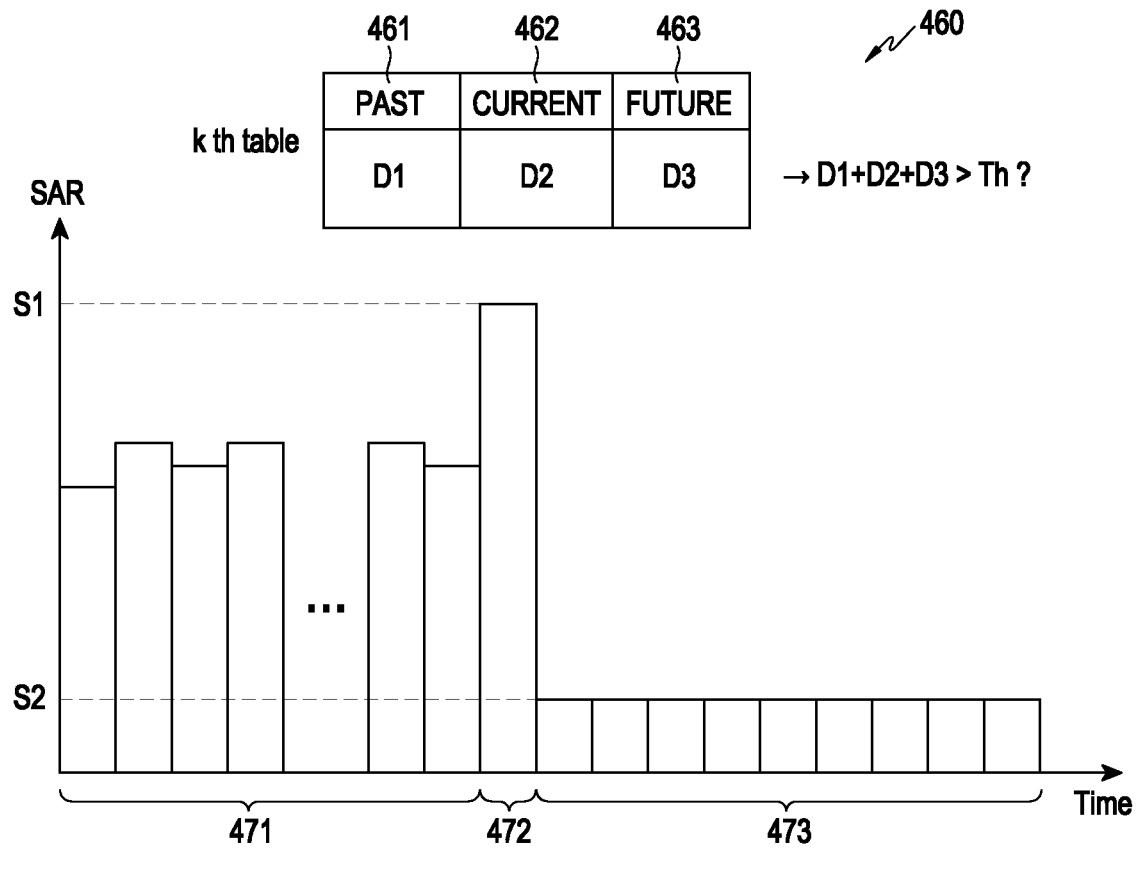
FIGS. 4D and 4E are tables illustrating transmission power per time according to various embodiments.
Figure 4E:
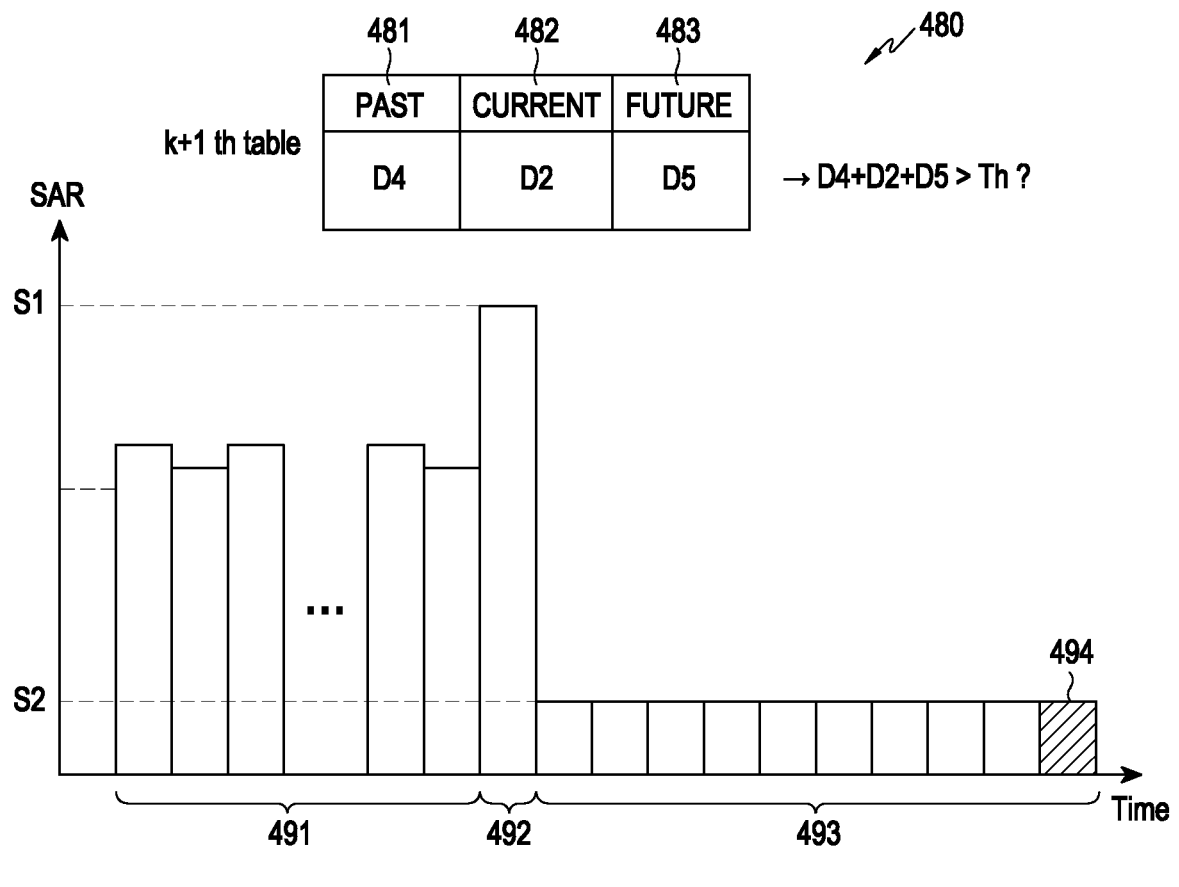

FIG. 3B is a flowchart illustrating an example method of operating an electronic device according to various embodiments. The embodiment of FIG. 3B is described with reference to FIGS. 3C and 4A, 4B, 4C, 4D and 4E. FIG. 3C is a graph illustrating transmission power and SAR over time according to various embodiments. FIGS. 4A, 4B and 4C are graphs illustrating transmission power per time according to various embodiments. FIGS. 4D and 4E are tables illustrating transmission power per time according to various embodiments.

According to various embodiments, an electronic device 101 (e.g., at least one of the processor 120, the first communication processor 212, the second communication processor 214, or the integrated communication processor 260) may invoke (or read) a plurality of tables for the transmission power corresponding to a plurality of times in operation 301. Before describing the embodiment associated with FIG. 3B, terms as shown in Table 1 are listed.

The table is described with reference to FIGS. 4A, 4B and 4C. Referring to FIG. 4A, a graph including transmission power for a plurality of times 401 to 449 is illustrated. The accumulated SAR (the accumulated SAR of Table 1) for a measurement time (the measurement time of Table 1), e.g., an measurement time including 50 time points, may be required to maintain a value below the maximum accumulated SAR (the max accumulated SAR of Table 1). The electronic device 101 may determine the transmission power of an RF signal to be transmitted at the current time point 449 to allow the accumulated SAR of nine future time points (e.g., the remain time of Table 1) in addition to the accumulated SAR at the current time point 449 and any past time points 409 to 448 (e.g., the average time of Table 1) to maintain below the maximum accumulated SAR. Further, as shown in FIG. 4B, the electronic device 101 may identify the transmission powers 452 which are one time point shifted from the transmission powers 451 at the current time point 449 and any past time points 409 to 448. Shifting by one time point may refer, for example, to not reflecting data at the oldest time point (e.g., time point 409 in FIG. 4A). The number of transmission powers 452 at the current time point 449 and any past time points 410 to 448 is 40 and may be one smaller than the number, 41, of the transmission powers 451 of FIG. 4A. The electronic device 101 may determine the transmission power at the current time point 449 to allow the sum of the SAR by the transmission powers 452 and the SAR predicted at additional future 10 time points to maintain the maximum accumulated SAR or less. As shown in FIG. 4C, the electronic device 101 may identify the transmission powers 453 at the current time point 449 and any past time points 434 to 448 which are 25 time point shifted from the transmission powers 451. The number of transmission powers 453 is 16 and may be 25 smaller than the number, 41, of the transmission powers 451 of FIG. 4A. The electronic device 101 may determine the transmission power at the current time point 449 to allow the sum of the SAR by the transmission powers 453 and the SAR predicted at additional future 34 time points to maintain the maximum accumulated SAR or less. Although not shown, the electronic device 101 may manage a plurality of graphs each of which is one time point shifted. The period of calculating the SAR is the measurement period P of Table 1 and may be, e.g., the interval between the transmission powers in FIGS. 4A to 4C. The electronic device 101 may calculate and/or manage T/P−1 tables for a specific time point.

TABLE 1 a.  Normal MAX Power: the maximum transmission power when SAR margin remains
b.  Normal Max SAR: the magnitude of SAR generated in normal MAX power
c.  Backoff MAX Power: the maximum transmission power when back-off is performed due to shortage of SAR margin
d.  Backoff Max SAR: the magnitude of SAR generated when operating in backoff max power
e.  Measurement Time(T): period for calculating the accumulated SAR or SAR average
f.  Measurement Period(P): period (or time interval) for calculating SAR
g.  Number of tables for calculating SAR: T/P − 1
h.  Average SAR LIMIT: the maximum value of the average SAR that should not be exceeded during T
i.  Average Time(A_Time): the time measured with SARs accumulated
j.  Accumulated SAR: the sum of SARs accumulated for average time.
k.  Max accumulated SAR: Average SAR LIMIT × measurement Time
l.  Average SAR: the magnitude of average SAR used for average Time
m.  Tx Room: Max accumulated SAR − accumulated SAR, SAR remaining after use
n.  Remain Time(R_Time): total measurement time − time (A_Time) during which SAR is measured up to now A configuration of identifying an expected SAR value is described with reference to FIGS. 4D and 4E.

Referring to FIG. 4D, the electronic device 101 may identify the kth SAR table 460. The kth SAR table 460 may include D1, which is the accumulated SAR value 461 at at least one past time point, the maximum SAR value (D2) 462 at the current time, and the expected SAR value (D3) 463 at at least one future time point. Referring to the graph, the accumulated SAR value corresponding to at least one past time point 461 may be D1. D1, which is the accumulated SAR value 461 at at least one past time point may be identified based on the antenna configuration. The number of at least one past time point may be a number that is one smaller than the total number (e.g., 100) of time points corresponding to the measurement time (e.g., 50 seconds) in the first table. N, which is the total number (e.g., 100) of time points may be a result of dividing the measurement time by the sampling period (or shift period). Accordingly, in the kth table, the number of at least one past time point may be k smaller than the total number of time points. The electronic device 101 may identify D1 which is the accumulated SAR value of the N-k past time points 471. The electronic device 101 may use the maximum SAR value S1 for the current time point 472. The maximum SAR value S1 (e.g., the normal max SAR in Table 1) may be the SAR value corresponding to a designated maximum transmission power (e.g., the normal max power of Table 1) in the electronic device 101. In an embodiment, for the current time point 472, the SAR value immediately before the current time point 472 may be used. In an embodiment, for the current time point 472, the average SAR value for the past time points 471 of the current time point 472 may be used. The electronic device 101 may calculate the sum of SAR values S2 (e.g., the backoff max SAR of Table 1) for the transmission power (e.g., the backoff max power of Table 1) backed off, for at least one future time point 473. The electronic device 101 may identify D3 as the accumulated SAR for at least one future time point 473. In the kth table, the number of at least one future time point may be k-1. Accordingly, the electronic device 101 may identify whether the total SAR sum D1+D2+D3 for N time points including N-k past time points, one current time point, and k-1 future time points exceeds the maximum accumulated SAR, for the kth table. Upon identifying the excess, the electronic device 101 may back off the transmission power of the current time point. Referring to FIG. 4E, the electronic device 101 may identify the k+1th table 480 as shown in FIG. 4E. For the k+1th table 480, the electronic device 101 may identify D4, which is the accumulated SAR value 481 of at least one past time point, D2, which is the maximum SAR value 482 of the current time point, and D5, which is the expected SAR value 483 of at least one future time point. The electronic device 101 may identify whether the accumulated SAR value of D4+D2+D5 exceeds the maximum accumulated SAR. The number of at least one past time point 491 in the k+1th table may be one smaller than the number of at least one past time point 471 in the kth table. The number of at least one future time point 493 in the k+1th table may be one (494) larger than the number of at least one future time point 473 in the kth table.

According to various embodiments, in operation 303, the electronic device 101 may identify the past accumulated SAR value and the expected SAR value at the current time point and future time point for a plurality of tables corresponding to at least one future time point. The electronic device 101 may identify the accumulated SAR value for a first table and a total of N-1 tables, which are shifted by i time points (where i is 1 or more and less than N-2) from the first table.

In operation 305, the electronic device 101 may identify whether there is a table in which the sum of the accumulated SAR value and the expected SAR value exceeds a threshold. If there is a table exceeding the threshold (yes in 305), the electronic device 101 may back off any one (or the maximum transmission power level (MTPL)) of at least some transmission powers of the RF signals in operation 307. It will be appreciated by one of ordinary skill in the art that the back-off of transmission power may be replaced with back-off of maximum transmission power level in the disclosure. If there is no table exceeding the threshold (no in 305), the electronic device 101 may transmit an RF signal in the set transmission power in operation 309. The back-off of the maximum transmission power value may refer, for example, to back-off of the maximum transmission power value in various embodiments of the disclosure.

As described above, the electronic device 101 may determine the maximum transmission power value so that the average SAR magnitude used during the measurement time does not exceed the average SAR limit. Or, the electronic device 101 may determine the maximum transmission power value so that the accumulated SAR during the measurement time does not exceed the max accumulated SAR. The electronic device 101 may determine the maximum value of the maximum power for the next time period every time P. For example, conditions for operating in normal max power during next time P may be as follows.

Condition: Tx Room>SAR generated when operating in normal max power during next P (normal max SAR of Table 1)+SAR (backoff max SAR of Table 1) generated when operating in backoff max power during (Remain Time–P)= P×normal max SAR+(Remain Time–P)×backoff max SAR In the condition, Tx Room may be the max accumulated SAR minus the SAR accumulated up to now. In the condition, (Remain Time–P) may be T–average time–P, e.g., the future time point described in connection with FIG. FIGS. 4A to 4E. P may refer, for example, to the current time point. Average time may refer, for example, to the past time point. Meeting the condition may refer, for example, to although the electronic device 101 sets the maximum transmission power of the normal max power during time P, there is no table in which the accumulated SAR exceeds the max accumulated SAR. Not meeting the condition may refer, for example, to there being a chance of presence of a table in which the accumulated SAR exceeds the max accumulated SAR if the electronic device 101 sets the maximum transmission power of the normal max power during time P, in which case the electronic device 101 may set the backoff max power as the maximum transmission power during time P.

Table 2 illustrates examples of variables and conditions.

TABLE 2

| [Example of variable settings] | |
| --- | --- |
| i. | Normal MAX Power: 23 dBm |
| ii. | Backoff MAX Power: 20 dBm |
| iii. | Measurement Time(T): 100 seconds |
| iv. | Measurement Period(P): 0.5 seconds |
| v. | Number of SAR Calculator tables: 199 |
| vi. | Average SAR LIMIT: 1.5 mW/g |
| vii. | Max accumulated SAR: 150 mW/g |

TABLE 2-continued

| [Example of variable settings] | |
|---|---|
| viii. | When Normal Max SAR => 23 dBm, SAR: 2 mW/g |
| ix. | When Backoff Max SAR => 20 dBm, SAR: 1 mW/g |

[time point when the maximum power switches from normal max power to backoff max power]Average time × normal max power + (100 − average time) × backoff max power <= time point when accumulated max SAR is met = Average time × 2 mW/g + (100 − average time) × 1 mW/g <= 150 mW/g <=> Average time <= 50

In the example of Table 2, it is described that continuous use of the normal max power in the maximum transmission power for 50 seconds is possible and, after 50 seconds, back-off to the backoff max power is required. For example, it is assumed to transmit an RF signal in 23 dBm which is the normal max power, for 50 seconds, transmit an RF signal in 23 dBm which is the normal max power for the next P (0.5 seconds), and transmit an RF signal in 20 dBm which is the backoff max power for 49.5 seconds which is (remain time−P). In this case, Tx Room may be 150 mW/g−50×2 mW/g, e.g., 50 mW/g. The SAR generated for time P may be 2 mW/g×0.5 seconds, e.g., 1 mW/g. The SAR generated during (remain time−P) may be 49.5 seconds×1 mW/g, e.g., 49.5 mW/g. In this case, it may be identified that the accumulated SAR during P and (remain time−P) is 50.5 mW/g which exceeds the Tx room, and thus, it is required to back off the maximum value of the transmission power at time P. The above-described example is described with reference to FIG. 3C which describes the transmission power associated with one RAT.

For example, referring to FIG. 3C, up to A seconds (e.g., 50 seconds), the maximum transmission power may be set to the normal max power 351 but, after A seconds, it may be identified to be backed off to the backoff max power 352. The slope of the second portion 362 of the accumulated SAR may be formed to be smaller than the slope of the first portion 361 of the accumulated SAR according to the backoff of the maximum value of the maximum transmission power. It may be identified that the average SAR 331 before A seconds exceeds the average SAR limit 340, but at the time when it is 100 seconds according to backoff, the average SAR 332 is identical to the value of the average SAR limit 340.

According to various embodiments, such an occasion may arise where the electronic device 101 transmits an RF signal for cellular data communication and an RF signal for Wi-Fi communication. For example, the electronic device 101 may transmit a first RF signal for cellular data communication and a second RF signal for Wi-Fi communication. In this case, the electronic device 101 may back off the maximum value of the transmission power of at least one RF signal so that the accumulated SAR of the sum of both the RF signals does not exceed the accumulated max SAR. For example, the electronic device 101 may perform backoff on the transmission power of the RF signal for Wi-Fi communication. For example, the electronic device 101 may back off the maximum transmission power level of the RF signal for Wi-Fi communication. For example, the electronic device 101 may reduce the average SAR limit allocated for Wi-Fi communication in which case the normal mas power for Wi-Fi communication and/or the backoff max power may be reduced.

Figure 5A:
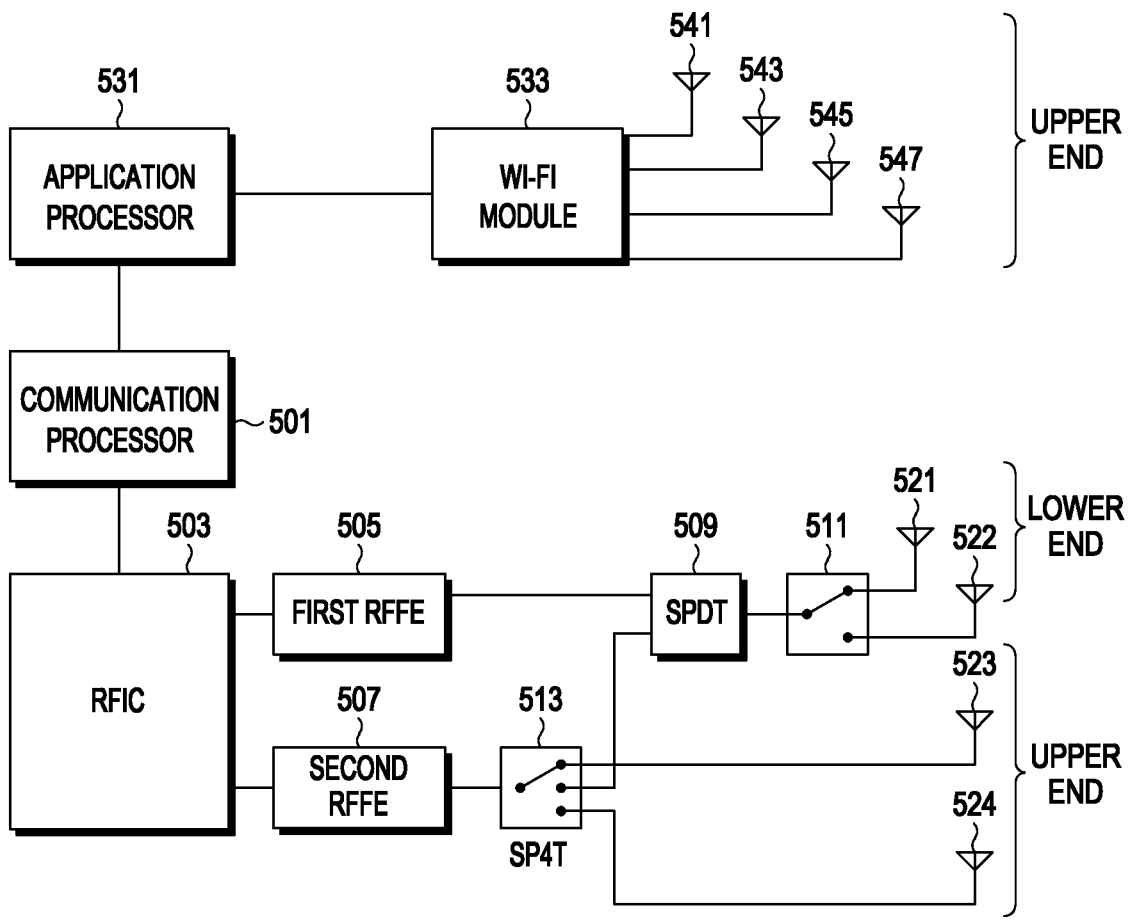
FIG. 5A is a block diagram illustrating an example configuration of an electronic device according to various embodiments.
Figure 5B:
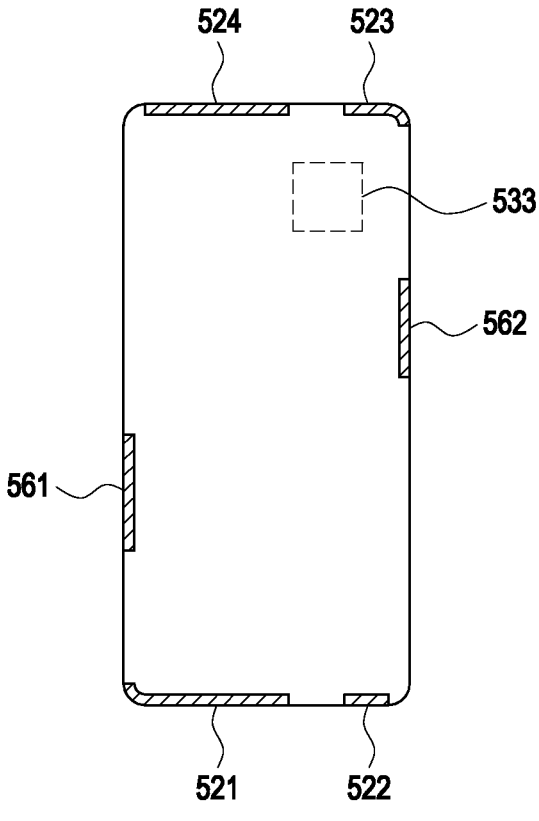
FIG. 5B is a diagram illustrating an example electronic device according to various embodiments.

FIG. 5A is a block diagram illustrating an example configuration of an electronic device according to various embodiments. The embodiment of FIG. 5A is described with reference to FIG. 5B. FIG. 5B is a diagram illustrating an example electronic device according to various embodiments.

According to various embodiments, the communication processor (e.g., at least one of the first communication processor 212, the second communication processor 214, or the integrated communication processor 260) may transmit and/or receive a baseband signal to/from an RFIC 503 (e.g., at least one of the first RFIC 222, the second RFIC 224, the third RFIC 226, or the fourth RFIC 228). The RFIC 503 may process at least one RF signal associated with at least one RF path. Here, the RF path may include, e.g., at least one piece of hardware (e.g., at least one of an RFIC, RFFE, or antenna) for transmitting an RF signal. For example, the RFIC 503 may receive at least one baseband signal from the communication processor 501 and generate at least one or more RF signals. It will be appreciated by one of ordinary skill in the art that although the RFIC 503 is shown as one module in the example of FIG. 5, this is an example, and the number of modules in which the RFIC 503 is implemented is not limited.

According to various embodiments, the RFIC 503 may provide at least one RF signal to the first RFFE 505 and/or the second RFFE 507. The first RFFE 505 and/or the second RFFE 507 may process (e.g., amplify) the received RF signal and provide the same. The communication processor 501 may determine the amplification degree of the RFFEs 505 and 507 based on the maximum transmission power level and/or transmission power determined as described above. Although not shown, the amplification degree of the RFFEs 505 and 507 may be controlled based on an average power tracking (APT) module and/or an envelope tracking (ET) module. According to various embodiments, one RFFE may process a plurality of RF signals.

According to various embodiments, the first RFFE 505 may be connected to a single pole double throw (SPDT) switch 509, and an output terminal of the SPDT switch 509 may be connected to the switch 511. The switch 511 may be configured to selectively connect the output terminal of the SPDT switch 509 to either the first antenna 521 or the second antenna 522. The second RFFE 507 may be connected to a single pole 4 throw (SP4T) switch 513. The SP4T switch 513 may be configured to selectively connect the output end of the second RFFE 507 to any one of the SPDT switch 509, the third antenna 523, or the fourth antenna 524. Meanwhile, each of the antennas 521, 522, 523, and 524 may be disposed inside the housing and/or may be disposed on a portion of the housing.

For example, it may be disposed on the outer surface of the housing of the electronic device 101, but is not limited thereto. In an example, as shown in FIG. 5B, the antennas 521 and 522 may be disposed on one side (e.g., lower end) of the housing of the electronic device 101, and the antennas 523 and 524 may be disposed on the other side (e.g., upper end) of the housing of the electronic device 101, but this is merely an example.

Referring back to FIG. 5A, according to various embodiments, an application processor (e.g., including processing circuitry) 531 (e.g., the processor 120) may be coupled to the communication processor (e.g., including processing circuitry) 501. The application processor 531 may be connected to the Wi-Fi module (e.g., including Wi-Fi circuitry) 533. At least one Wi-Fi antenna 541, 543, 545, and 547 may be connected to (or included in) the Wi-Fi module 533. The Wi-Fi module 533 may provide an RF signal for Wi-Fi communication to at least some of the Wi-Fi antennas 541, 543, 545, and 547. In one example, as shown in FIG. 5B, the Wi-Fi module 533 may be disposed in a relatively upper portion of the housing. Meanwhile, although FIG. 5B illustrates as if the electronic device 101 further includes antenna arrays 561 and 562 for mmWave, this is merely an example. In some cases, an RF signal for cellular data communication may be provided to at least some of the antennas 521, 522, 523, and 524, and an RF signal for Wi-Fi communication may be provided to at least some of the Wi-Fi antennas 541, 543, 545, and 547. For example, whether it is determined whether the SAR restrictions are violated based on the sum of exposures (e.g., SARs and/or PDs) generated by the plurality of antennas or it is determined whether the SAR restrictions are violated independently from the exposures generated by the plurality of antennas may be determined by Equation 1 below.

$$(SAR_1+SAR_2)^{1.5}/R \leq 0.04 \qquad \text{[Equation 1]}$$

In Equation 1, $SAR_1$ may be the SAR generated by one antenna, and $SAR_2$ may be the SAR generated by another antenna, and their unit may be, e.g., W/kg. R for the sum of various SARs may be shown in Table 3, for example. Meanwhile, the values, 1.5 and 0.04, in Equation 1 are merely examples and are not limited thereto.

TABLE 3

| Sum of SARs ($SAR_1$ + $SAR_2$) (W/Kg) | Minimum spacing (minimum value of R) (mm) |
| --- | --- |
| 3.2 | 143 |
| 2.8 | 117 |
| 2.4 | 93 |
| 2 | 71 |
| 1.6 | 51 |
| 1.4 | 41 |
| 1.2 | 33 |
| 1.0 | 25 |
| 0.8 | 18 |

For example, it is assumed that the sum of SARs generated from the third antenna 523 and the Wi-Fi antenna 541 is 3.2 W/Kg. For example, up to 1.6 W/Kg of SAR may be allocated to the third antenna 523 (e.g., cellular data), and up to 1.6 W/Kg of SAR may be allocated to the Wi-Fi antenna 541 (e.g., Wi-Fi communication), but the above values are examples. Meanwhile, as the third antenna 523 and the Wi-Fi antenna 541 both are disposed at an upper end of the electronic device 101, the spacing may be less than 143 mm. In this case, to determine whether the SAR rule is instantaneously violated or the accumulated SAR rule is violated by the electronic device 101, it may be required to determine whether the sum of SARs generated from the third antenna 523 and the Wi-Fi antenna 541 violates the SAR rule. To observe the SAR rule, the electronic device 101 may perform backoff associated with the transmission power of the RF signal for Wi-Fi communication, for example. Meanwhile, when an RF signal in FR2 is transmitted, power density (PD) may replace SAR. For example, it will be appreciated by one of ordinary skill in the art that when SAR and PD both are considered, the sum of RF exposures may be identified as the sum of the value obtained by dividing the SAR by the maximum SAR and the value obtained by dividing the PD by the maximum PD, and the minimum spacing corresponding to the sum of RF exposures may be determined.

Meanwhile, it is assumed that the sum of SARs generated from the first antenna 521 and the Wi-Fi antenna 541 is 3.2 W/Kg. As the first antenna 521 and the Wi-Fi antenna 541 are disposed at a lower end and an upper end, respectively, of the electronic device 101, the spacing may be 143 mm or more. In this case, to determine whether the SAR rule is instantaneously violated or the accumulated SAR rule is violated by the electronic device 101, it may be required to determine whether the sum of SARs generated from the Wi-Fi antenna 541 violates the SAR rule and/or whether the sum of SARs generated from the first antenna 521 violates the SAR rule. In this case, the electronic device 101 may refrain from performing back-off associated with the transmission power of the RF signal for Wi-Fi communication, or may restore the maximum transmission power level that was back-off.

As described above, the antennas for which the sum of SARs is considered to determine whether the SAR rule is violated as Equation 1 is met may be represented as included in the same antenna group. When the distance between antennas is relatively small (e.g., smaller than the distance related to Equation 1), they may be included in the same antenna group. Further, the antennas for which SARs are considered independently, rather than the sum of SARs, to determine whether the SAR rule is violated as Equation 1 is not met may be represented as included in different antenna groups. When the distance between antennas is relatively large (e.g., larger than the distance related to Equation 1), they may be included in different antenna groups.

In the case where it is determined whether the maximum transmission power level is back-off based on the accumulated SAR (or average SAR), if the antenna for cellular data communication and the Wi-Fi antenna are included in different antenna groups, an average SAR limit may be allocated to cellular data communication, and another average SAR limit may be allocated to Wi-Fi communication. For example, if the value average SAR limit is A, the average SAR limit of "A" may be allocated to cellular data communication, and the average SAR limit of "A" may be allocated to Wi-Fi communication. Meanwhile, when the antenna for cellular data communication and Wi-Fi antenna are included in the same antenna group, the average SAR limits should be separately allocated to cellular data communication and Wi-Fi communication, respectively. For example, if the average SAR limit of "C" is allocated to cellular data communication, the average SAR limit of "A-C" may be allocated to Wi-Fi communication. The average SAR limit allocated to Wi-Fi communication may be smaller when they are included in the same antenna group than when they are included in different antenna groups. Accordingly, backoff associated with the transmission power for Wi-Fi communication may be performed.

According to various embodiments, when the distance between the antenna for cellular data communication and the Wi-Fi antenna exceeds a threshold distance (or when included in different antenna groups), the electronic device 101 may refrain from performing a back-off operation associated with the transmission power of the RF signal for Wi-Fi or may stop the back-off operation (e.g., restore the maximum transmission power level and/or restore the average SAR limit). When the distance between the antenna for cellular data communication and the Wi-Fi antenna is the threshold distance or less (or when included in the same antenna group), the back-off operation associated with the transmission power of the Wi-Fi RF signal (e.g., back off the maximum transmission power level and/or reduce the average SAR limit) may be performed. Accordingly, a back-off operation for the transmission power of Wi-Fi communication may be performed only when the antenna for cellular data communication disposed within a distance where the SAR rule may be violated is used, rather than the back-off operations on the transmission power of Wi-Fi communication being collectively performed according to activation of cellular data communication.

21

Figure 5C:
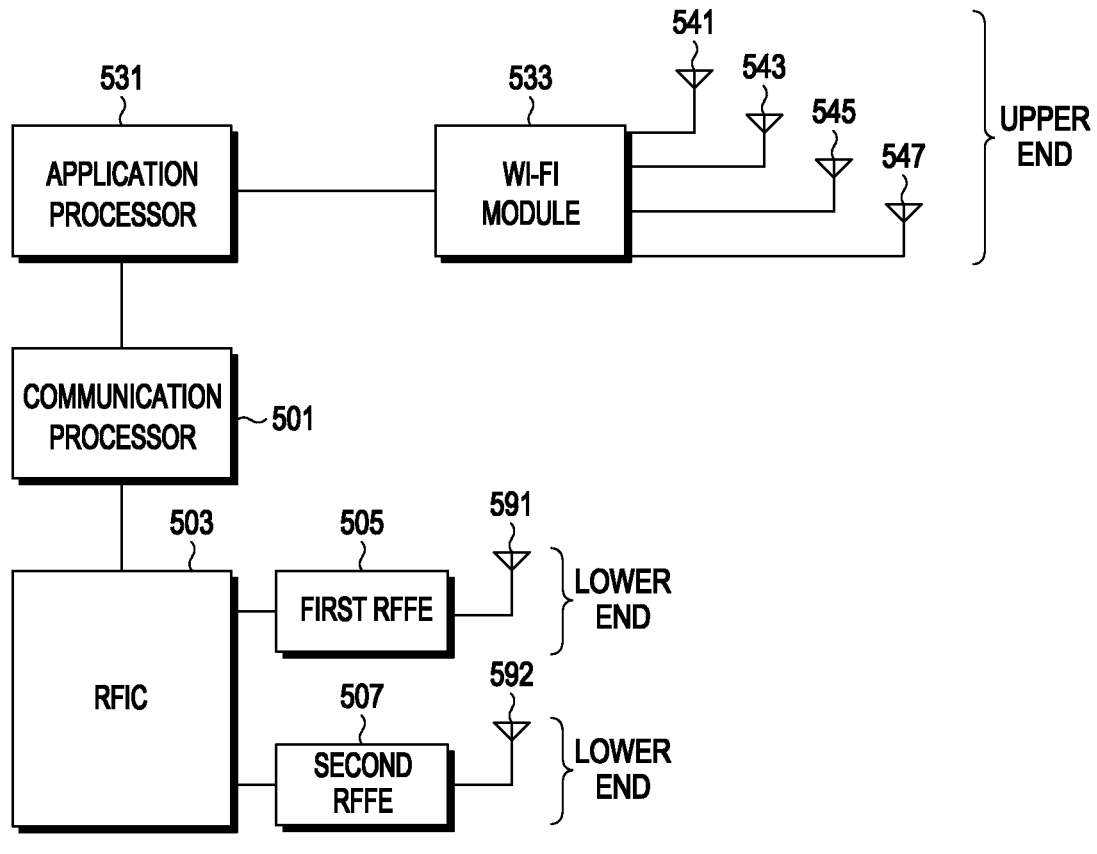
FIG. 5C is a block diagram illustrating an example configuration of an electronic device according to various embodiments.

FIG. 5C is a block diagram illustrating an example configuration of an electronic device according to various embodiments.

Referring to FIG. 5C, according to various embodiments, an electronic device 101 may include an antenna 591 connected to a first RFFE 505 and disposed relatively at a lower end and an antenna 592 connected to a second RFFE 507 and disposed relatively at an upper end. The first RFFE 505 and the second RFFE 507 may include an RX path including, e.g., an LNA, and a coupler for measuring the reception strength (e.g., RSSP, but not limited thereto) may be connected to the RX path. The electronic device 101 may periodically identify the reception strength identified through the coupler. For example, while the RF signal is transmitted through the first antenna 591, the first reception strength corresponding to the first antenna 591 may be measured as being smaller than the second reception strength corresponding to the second antenna 592 by a designated threshold or less. In this case, the electronic device 101 may change the antenna used for transmission from the first antenna 591 to the second antenna 592, which may be referred to as TX hopping. Even by TX hopping, the distance between the antenna for cellular data communication and the Wi-Fi antenna may exceed a threshold distance or be the threshold distance or less. Accordingly, the electronic device 101 may determine whether to perform a back-off operation associated with the transmission power of the RF signal for Wi-Fi based on a change of the antenna used for transmission by TX hopping, as well as antenna switching.

Figure 6A:
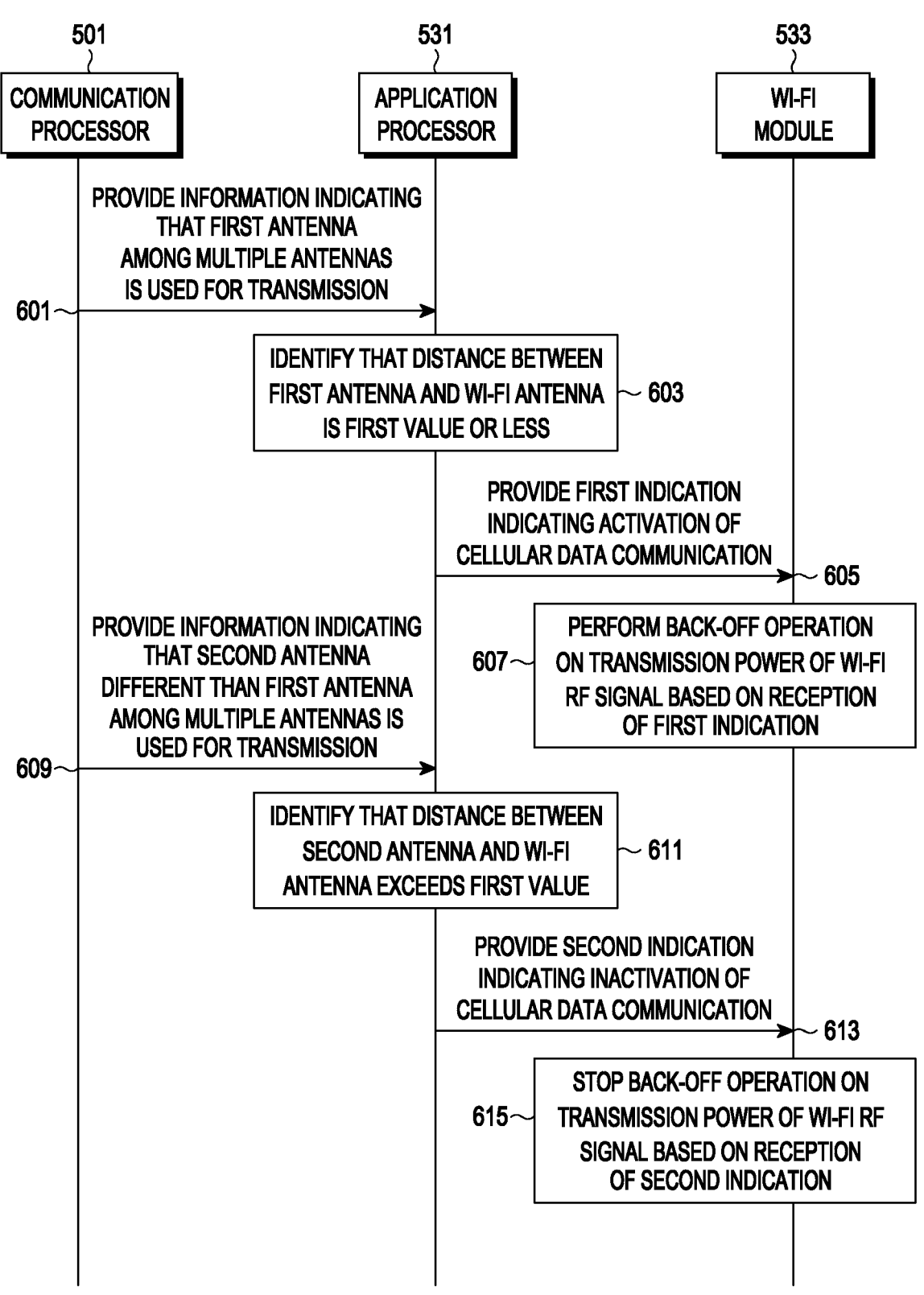
FIG. 6A is a signal flow diagram illustrating example operations of a communication processor, an application processor, and a Wi-Fi module according to various embodiments.

FIG. 6A is a signal flow diagram illustrating example operations of a communication processor, an application processor, and a Wi-Fi module according to various embodiments.

According to various embodiments, in operation 601, the communication processor 501 may provide information to the application processor 531 indicating that a first antenna among a plurality of antennas is used for transmission. For example, the communication processor 501 may establish a connection (e.g., RRC connection) with the network. The communication processor 501 may select the first antenna from among the plurality of antennas based on the operating band and/or frequency for connection, but it will be appreciated by one of ordinary skill in the art that the condition for selecting an antenna is not limited. For example, the communication processor 501 may change the used antenna from the existing antenna to the first antenna based on transmission antenna hopping (or referred to as TX hopping) and/or antenna switching, and it will be appreciated by one of ordinary skill in the art that the scheme of changing the used antenna is not limited. The information is not limited as long as it is information for identifying the first antenna. Or, the information transferred from the communication processor 501 to the application processor 531 may be information for identifying the antenna group where the first antenna is included. For example, the antenna group may be represented as a first group including antennas disposed at an upper end of the housing of the electronic device 101 and a second group including antennas disposed at a lower end of the housing of the electronic device 101, but the number of antenna groups, expression format, and/or group dividing scheme is not limited.

According to various embodiments, the application processor 531 may receive information indicating that the first antenna is used from the communication processor 501. In operation 603, the application processor 531 may identify that the distance between the first antenna and the Wi-Fi antenna is a first value or less. The first value may be a distance at which the RF exposure corresponding to each of the plurality of RF signals, as shown in, e.g., Equation 1, is independently processable. When the distance between the antennas exceeds the first value, the RF exposure may be independently processed. In an example, the first value may be set based on the Wi-Fi module 533 (or Wi-Fi antenna). For example, the application processor 531 may reference the distances between the plurality of antennas for cellular data communication and the Wi-Fi module 533 (or Wi-Fi antenna). For example, information about the distance between each antenna for cellular data communication and the Wi-Fi module 533 (or Wi-Fi antenna) as shown in Table 4 may be stored in the electronic device 101.

TABLE 4

| antenna for cellular data communication | distance from Wi-Fi module 533 |
|---|---|
| first antenna 521 | L1 |
| second antenna 522 | L2 |
| third antenna 523 | L3 |
| fourth antenna 524 | L4 |

The application processor 531 may identify the distance between the Wi-Fi module 533 and the antenna scheduled to be used, based on the information as shown in Table 4, for example. The application processor 531 may identify whether the identified distance is the first value or less. Meanwhile, in another example, the application processor 531 may also calculate the distance, and the method for identifying the distance between the antenna for cellular data communication and the Wi-Fi module 533 is not limited.

In another example, the application processor 531 may reference information as shown in Table 5 as to whether the distances between the plurality of antennas for cellular data communication and the Wi-Fi module 533 (or Wi-Fi antenna) are the first value or less.

TABLE 5

| antenna for cellular data communication | whether distance from Wi-Fi module 533 is first value or less |
|---|---|
| first antenna 521 | No |
| second antenna 522 | No |
| third antenna 523 | Yes |
| fourth antenna 524 | Yes |

The application processor 531 may identify whether the distance between the Wi-Fi module 533 and the antenna scheduled to be used is the first value or less, based on the information as shown in Table 5, for example. It will be appreciated by one of ordinary skill in the art that the "whether distance from Wi-Fi module 533 is first value or less" of Table 5 may be replaced with "whether identical to the same antenna group as Wi-Fi module 533." Further, it will be appreciated by one of ordinary skill in the art that the operation of identifying that the distance between the first antenna and the Wi-Fi antenna is the first value or less in operation 603 may be replaced with the operation of identifying that the first antenna and the Wi-Fi antenna are included in the same antenna group.

According to various embodiments, the first value may be a fixed value. In an example, the first value may be 143 mm corresponding to the sum, 3.2 W/Kg, of both the SARs, but the first value is not limited. In another example, the first value may be a changeable value. For example, the electronic device 101 may determine the first value based on the SAR (or PD) corresponding to cellular data communication and the SAR corresponding to Wi-Fi communication.

According to various embodiments, the application processor 531 may provide a first indication indicating activation of cellular data communication to the Wi-Fi module 533 based on the distance between the first antenna and the Wi-Fi antenna being the first value or less, in operation 605. When the distance between the first antenna and the Wi-Fi antenna is the first value or less, the RF exposures by both communications should be processed together, so that the first indication indicating activation of cellular data communication may be provided to the Wi-Fi module 533.

In operation 607, the Wi-Fi module 533 may perform a back-off operation on the transmission power of Wi-Fi RF signal based on reception of the first indication. For example, the Wi-Fi module 533 may back off the maximum transmission power level of the Wi-Fi RF signal so that the sum of the SAR based on Wi-Fi communication and the SAR based on cellular data communication at a specific time point meets the SAR restriction. Accordingly, the Wi-Fi module 533 may set a value equal to or smaller than the backed-off maximum transmission power level as the transmission power. For example, the Wi-Fi module 533 may perform the back-off operation so that the sum of the accumulated SAR (or average SAR) based on Wi-Fi communication and the accumulated SAR (or average SAR) based on cellular data communication in a specific time period meets the SAR restriction (e.g., the restriction associated with the accumulated SAR). For example, the Wi-Fi module 533 may reduce the average SAR limit. As the average SAR limit reduces, the value of the maximum transmission power level and/or backed-off maximum transmission power level of the RF signal for Wi-Fi communication may be reduced. Or, the time point when the maximum transmission power level is backed off may be brought forward as compared with the existing one.

According to various embodiments, in operation 609, the communication processor 501 may provide information indicating that a second antenna different from the first antenna among a plurality of antennas is used for transmission. For example, the communication processor 501 may change the antenna for RF signal transmission from the first antenna to the second antenna. The change of antennas for RF signal transmission may be performed by, e.g., handover, antenna switching, TX hopping, RRC connection reestablishment, or establishment of another RRC connection after RRC connection release, but it will be appreciated by one of ordinary skill in the art that the event for changing antennas is not limited.

In operation 611, the application processor 531 may identify that the distance between the second antenna and the Wi-Fi antenna exceeds the first value. Meanwhile, as described above, the application processor 531 may identify the distance between the second antenna and the Wi-Fi antenna by referencing information as shown in Table 4 and identify whether the identified distance exceeds the first value. Or, the application processor 531 may identify whether the distance between the second antenna and the Wi-Fi antenna exceeds the first value by referencing information as shown in Table 5.

In operation 613, the application processor 531 may provide a second indication indicating inactivation of cellular data communication to the Wi-Fi module 533 based on the distance between the second antenna and the Wi-Fi antenna exceeding the first value.

In operation 615, the Wi-Fi module 533 may stop a back-off operation on the transmission power of Wi-Fi RF signal based on reception of the second indication. For example, the Wi-Fi module 533 may restore the backed-off maximum transmission power level. For example, the Wi-Fi module 533 may restore the reduced average SAR limit. As the average SAR limit is restored, the value of the maximum transmission power level and/or backed-off maximum transmission power level of the RF signal for Wi-Fi communication may be restored. Or, the time point when the maximum transmission power level is backed off may be delayed as compared with the existing one.

Meanwhile, providing the first indication in operation 605 is merely an example, and provision of the first indication may be omitted. For example, upon identifying that the first indication has already been provided or the Wi-Fi module 533 performs a back-off operation, the application processor 531 may not provide the first indication although the distance between the first antenna and the Wi-Fi antenna is the first value or less. Or, when the Wi-Fi module 533 is already performing a back-off operation, it may be configured to keep on performing the back-off operation based on reception of the first indication. Further, providing the second indication in operation 613 is merely an example, and provision of the second indication may be omitted. For example, upon identifying that the second indication has already been provided or the Wi-Fi module 533 normally operates (e.g., back-off operation is not performed), the application processor 531 may not provide the second indication although the distance between the first antenna and the Wi-Fi antenna exceeds the first value. Or, when the Wi-Fi module 533 has already stopped the back-off operation, no additional operation may be performed in response to reception of the second indication.

Meanwhile, in an embodiment, the communication processor 501 may directly provide information that the first antenna is used or information that the second antenna is used to the Wi-Fi module 533. The Wi-Fi module 533 may identify the distance between the first antenna or second antenna and the Wi-Fi antenna and identify whether the identified distance is the first value or less, by referencing, e.g., information as shown in Table 4. Or, the communication processor 501 may identify whether the distance between the first antenna or second antenna and the Wi-Fi antenna is the first value or less by referencing information as shown in Table 5. If the identified distance is identified to be the first value or less, the Wi-Fi module 533 may perform a back-off operation. Upon identifying that the identified distance exceeds the first value, the Wi-Fi module 533 may stop the back-off operation.

Meanwhile, although it is described in FIG. 6A that the first antenna is used and is then changed into the second antenna, this is merely an example, and according to various embodiments, the electronic device 101 may use the second antenna and then the first antenna. In this case, it will be appreciated by one of ordinary skill in the art that the electronic device 101 does not perform a back-off operation while using the second antenna and then may perform a back-off operation based on use of the first antenna.

Figure 6B:
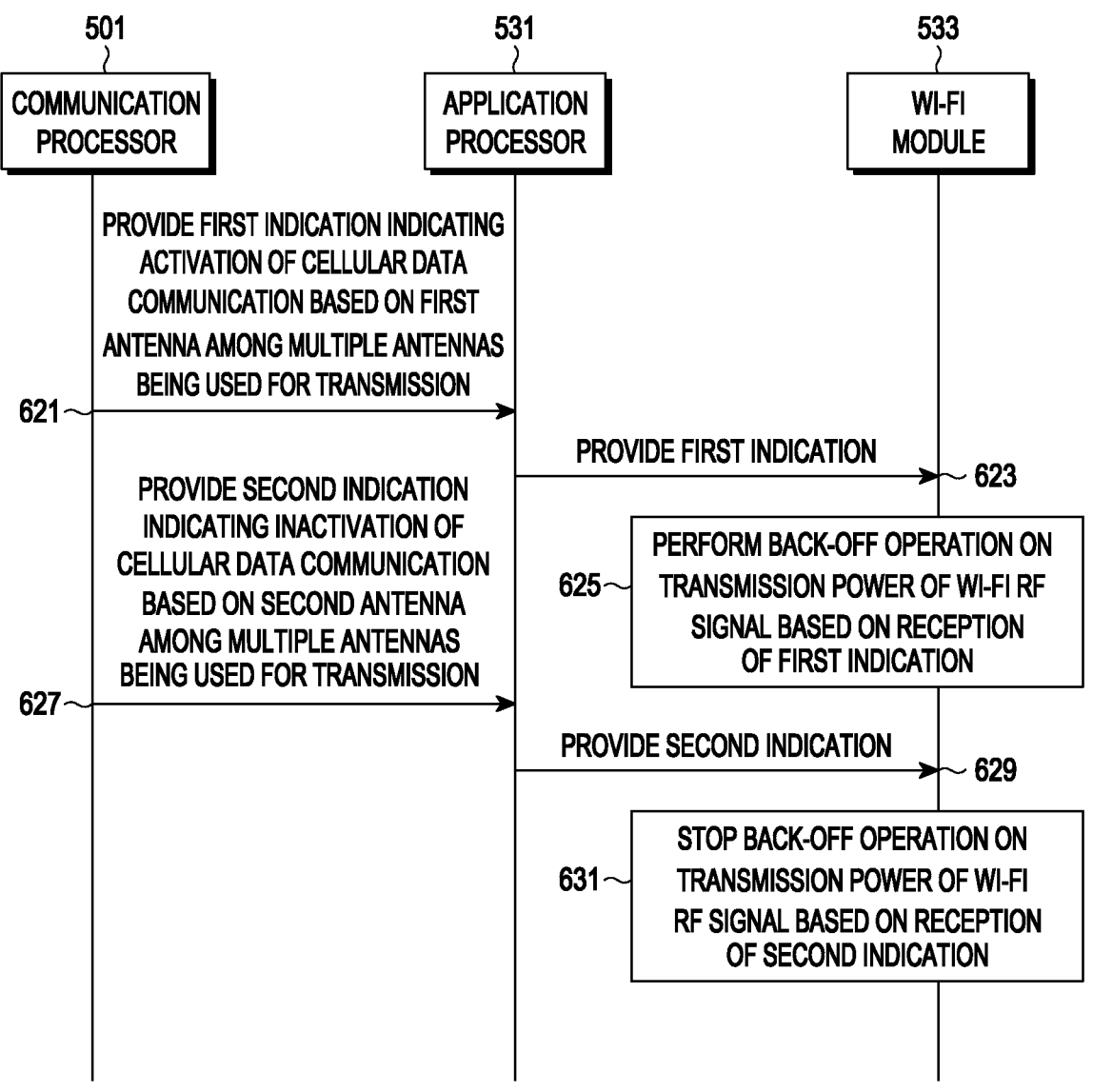
FIG. 6B is a signal flow diagram illustrating example operations of a communication processor, an application processor, and a Wi-Fi module according to various embodiments.

FIG. 6B is a signal flow diagram illustrating example operations of a communication processor, an application processor, and a Wi-Fi module according to various embodiments.

According to various embodiments, in operation 621, the communication processor 501 may provide a first indication indicating activation of cellular data communication based on the first antenna among a plurality of antennas being used for transmission. The distance between the first antenna and the Wi-Fi module 533 (or Wi-Fi antenna) may be, e.g., the first value or less. In the embodiment of FIG. 6A, it is described that the application processor 531 provides the first indication based on use of the first antenna and/or provides a second indication based on use of the second antenna. In the embodiment of FIG. 6B, the communication processor 501 may provide the first indication indicating activation of cellular data communication based on the antenna for which the distance to the Wi-Fi module 533 (or Wi-Fi antenna) is the first value or less being used for transmission. The operation of the application processor 531 may be understood as an operation based on, e.g., radio interface layer (RIL), but it will be appreciated by one of ordinary skill in the art that it is not limited. For example, the communication processor 501 may identify the distance between the first antenna and the Wi-Fi antenna by referencing information as shown in Table 4 and identify whether the identified distance is the first value or less. Or, the communication processor 501 may identify whether the distance between the first antenna and the Wi-Fi antenna is the first value or less by referencing information as shown in Table 5.

According to various embodiments, in operation 623, the application processor 531 may provide the first indication to the Wi-Fi module 533. Meanwhile, reception and transmission (or relay) of the first indication by the application processor 531 is merely an example, and the communication processor 501 may provide the first indication to the Wi-Fi module 533 directly without relying on the application processor 531.

In operation 625, the Wi-Fi module 533 may perform a back-off operation on the transmission power of Wi-Fi RF signal based on reception of the first indication. Meanwhile, it will be appreciated by one of ordinary skill in the art that providing information from the communication processor 501 to the Wi-Fi module 533 without relying on the application processor 531 is possible in various embodiments as well as the present embodiment.

According to various embodiments, in operation 627, the communication processor 501 may provide a second indication indicating inactivation of cellular data communication based on the second antenna among the plurality of antennas being used for transmission. The distance between the second antenna and the Wi-Fi module 533 (or Wi-Fi antenna) may exceed, e.g., the first value. As described above, the communication processor 501 may change the antenna used for RF signal transmission from the first antenna to the second antenna.

In operation 629, the application processor 531 may provide the second indication to the Wi-Fi module 533. Meanwhile, reception and transmission (or relay) of the second indication by the application processor 531 is merely an example, and the communication processor 501 may provide the second indication to the Wi-Fi module 533 directly without relying on the application processor 531.

In operation 631, the Wi-Fi module 533 may stop a back-off operation on the transmission power of Wi-Fi RF signal based on reception of the second indication. Meanwhile, although it is described in FIG. 6B that the first antenna is used and is then changed into the second antenna, this is an example, and according to various embodiments, the electronic device 101 may use the second antenna and then the first antenna. In this case, it will be appreciated by one of ordinary skill in the art that the electronic device 101 does not perform a back-off operation while using the second antenna and then may perform a back-off operation based on use of the first antenna.

Figure 7A:
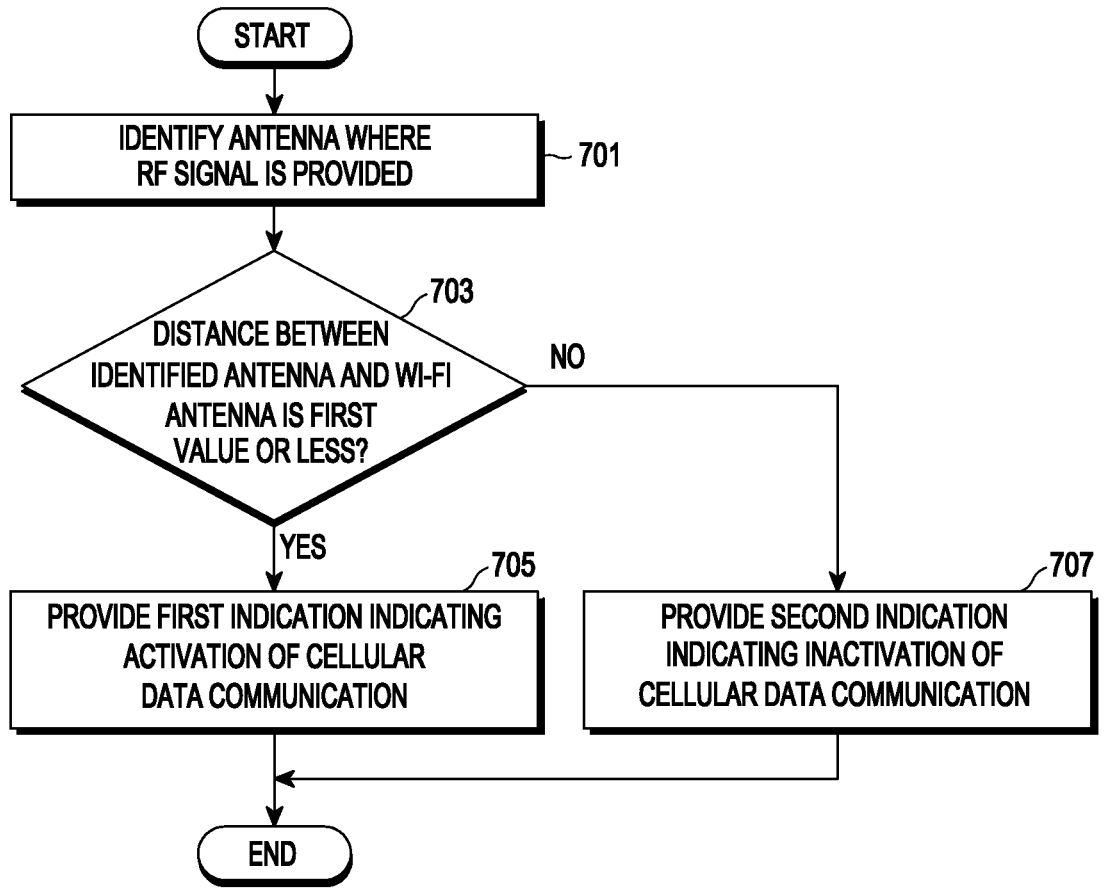
FIG. 7A is a flowchart illustrating an example method of operating an electronic device according to various embodiments.

FIG. 7A is a flowchart illustrating an example method of operating an electronic device according to various embodiments.

According to various embodiments, in operation 701, the electronic device 101 (e.g., the communication processor 501 and/or the application processor 531) may identify the antenna where an RF signal is provided.

In operation 703, the electronic device 101 may identify whether the distance between the identified antenna and the Wi-Fi antenna is the first value or less. Or, it will be appreciated by one of ordinary skill in the art that it is also possible to identify whether the identified antenna and the Wi-Fi antenna are included in the same antenna group. If the distance between the identified antenna and the Wi-Fi antenna is the first value or less (yes in 703), the electronic device 101 may provide the first indication indicating activation of cellular data communication in operation 705. For example, the application processor 531 may provide the first indication to the Wi-Fi module 533. For example, the communication processor 501 may provide the first indication to the application processor 531 or the Wi-Fi module 533. If the distance between the identified antenna and the Wi-Fi antenna exceeds the first value (no in 703), the electronic device 101 may provide the second indication indicating inactivation of cellular data communication in operation 707. For example, the application processor 531 may provide the second indication to the Wi-Fi module 533. For example, the communication processor 501 may provide the second indication to the application processor 531 or the Wi-Fi module 533.

Figure 7B:
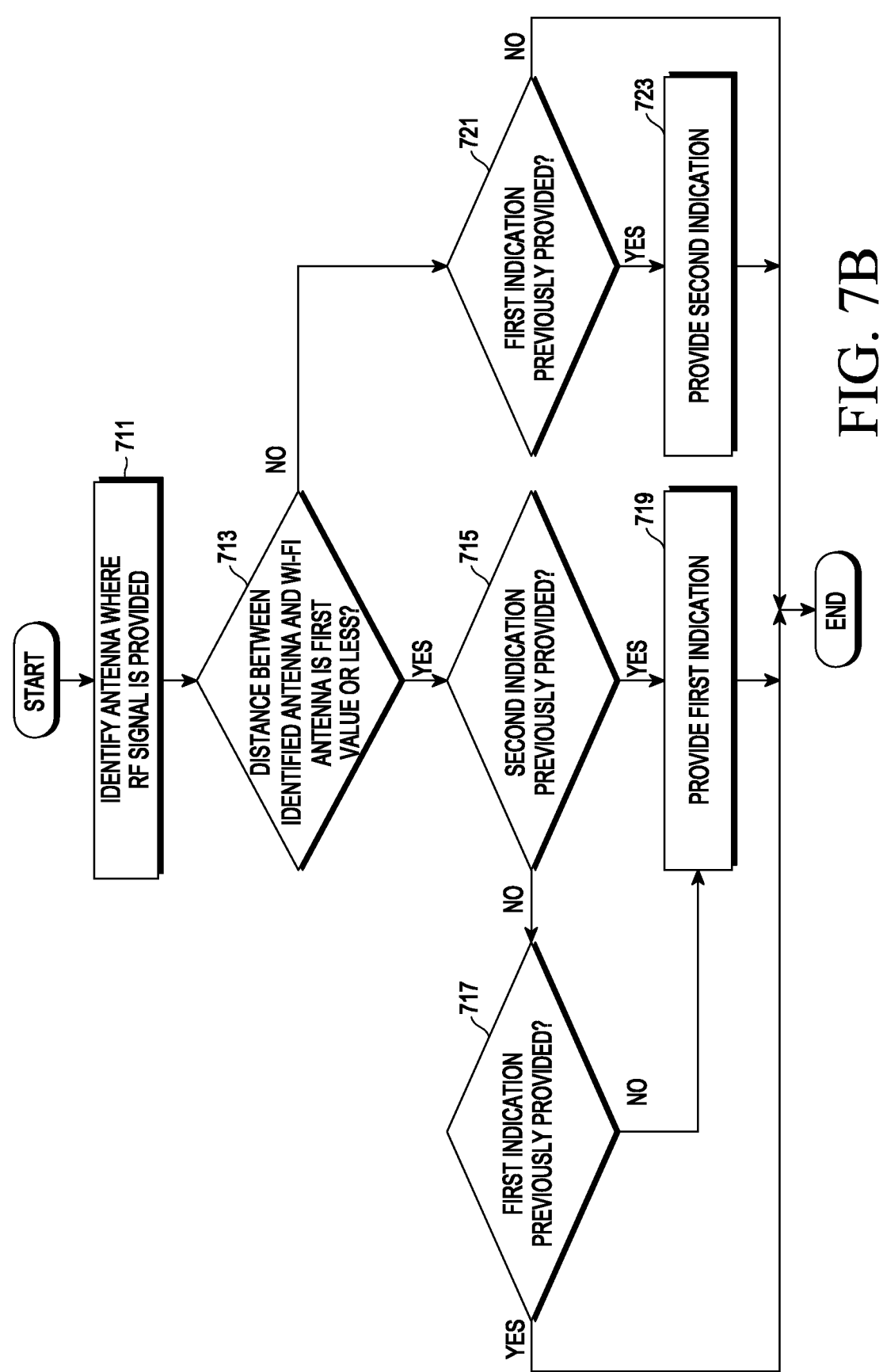
FIG. 7B is a flowchart illustrating an example method of operating an electronic device according to various embodiments.

FIG. 7B is a flowchart illustrating an example method of operating an electronic device according to various embodiments.

According to various embodiments, in operation 711, the electronic device 101 (e.g., the communication processor 501 and/or the application processor 531) may identify the antenna where an RF signal is provided.

In operation 713, the electronic device 101 may identify whether the distance between the identified antenna and the Wi-Fi antenna is the first value or less. When the distance between the identified antenna and the Wi-Fi antenna is the first value or less (yes in 713), the electronic device 101 may identify whether the second indication has already been provided in operation 715. For example, the electronic device 101 may identify whether the indication provided immediately before is the second indication. If the second indication has already been provided (yes in 715), the electronic device 101 may provide the first indication in operation 719. If the second indication has not already been provided (no in 715), the electronic device 101 may identify whether the first indication has already been provided in operation 717. If the first indication has not been provided (no in 717), the electronic device 101 may provide the first indication in operation 719. If the first indication has been provided (yes in 717), the electronic device 101 may refrain from providing the first indication. Meanwhile, refraining from providing the first indication is merely an example, and the electronic device 101 may be configured to provide the first indication even when the second indication has not already been provided. In this case, the Wi-Fi module 533 may keep on performing the back-off operation without performing any additional operation on the first indication further received while performing the back-off operation based on reception of the first indication. When the distance between the identified antenna and the Wi-Fi antenna exceeds the first value (no in 713), the electronic device 101 may identify whether the first indication has already been provided in operation 721. For example, the electronic device 101 may identify whether the indication provided immediately before is the first indication. If the first indication has already been provided (yes in 721), the electronic device 101 may provide the second indication in operation 723. If the first indication is not provided (no in 721), the electronic device 101 may refrain from providing the second indication. Meanwhile, refraining from providing the second indication is merely an example, and the electronic device 101 may be configured to provide the second indication even when the first indication has not already been provided. In this case, the Wi-Fi module 533 may keep on performing the normal operation (e.g., an operation performed when the back-off operation is not performed) without performing any additional operation on the second indication further received after stopping the back-off operation based on reception of the second indication.

Figure 8A:
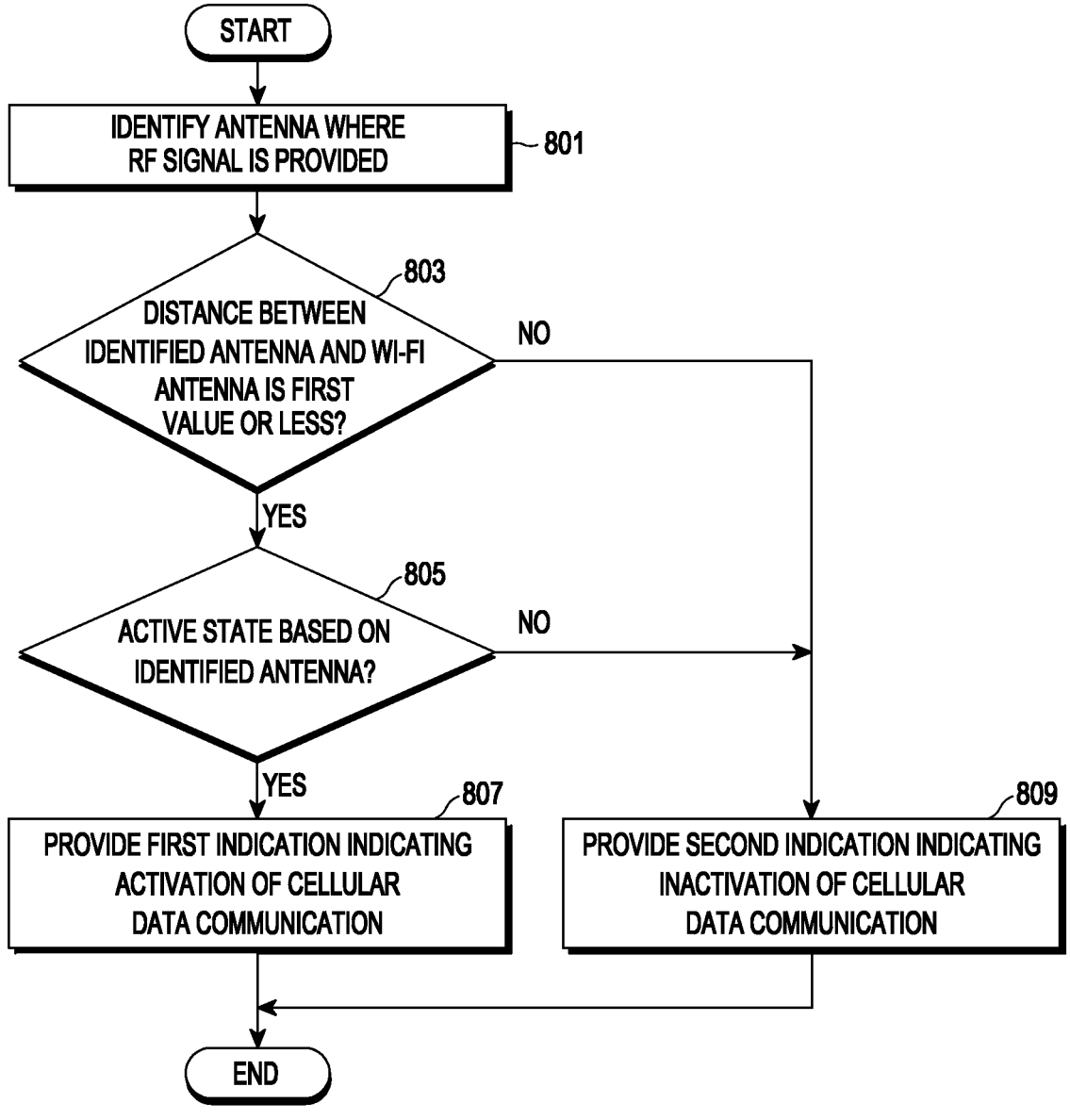
FIG. 8A is a flowchart illustrating example operations of an electronic device according to various embodiments.

FIG. 8A is a flowchart illustrating example operations of an electronic device according to various embodiments.

According to various embodiments, in operation 801, the electronic device 101 (e.g., the communication processor 501 and/or the application processor 531) may identify the antenna where an RF signal is provided.

In operation 803, the electronic device 101 may identify whether the distance between the identified antenna and the Wi-Fi antenna is the first value or less. As described above, the electronic device 101 may replace operation 803 to identify whether the identified antenna and the Wi-Fi antenna are included in the same antenna group. When the distance between the identified antenna and the Wi-Fi antenna is the first value or less (yes in 803), the electronic device 101 may identify whether it is in an active state based on the identified antenna in operation 805. For example, the electronic device 101 may identify whether the RRC state based on the identified antenna is an RRC connected state. For example, the electronic device 101 may identify whether it is before entering a continuous discrete reception (C-DRX) mode in the RRC connected state based on the identified antenna.

If it is in the active state based on the identified antenna (yes in 805), the electronic device 101 may provide the first indication indicating activation of cellular data communication in operation 807. If it is not in the active state based on the identified antenna (no in 805), the electronic device 101 may provide the second indication indicating inactivation of cellular data communication in operation 809. Or, the electronic device 101 may refrain from providing the first indication. For example, in the RRC idle state or RRC inactive state, rather than the RRC connected state, the electronic device 101 may refrain from providing the first indication and/or provide the second indication although the distance between the identified antenna and the Wi-Fi antenna is the first value or less. Accordingly, even in a context where no RF signal is transmitted, performing backoff on the Wi-Fi RF signal may be prevented. Meanwhile, the embodiment of FIG. 8A may be performed when the electronic device 101 determines whether to back off based on the accumulated SAR, but is not limited.

FIG. 8B is a signal flow diagram illustrating example operations of a communication processor, an application processor, and a Wi-Fi module according to various embodiments.

According to various embodiments, in operation 831, the communication processor 501 may provide information indicating that the second antenna among the plurality of antennas is used for transmission and is in communication active state.

In operation 833, the application processor 531 may refrain from providing the first indication based on the distance between the second antenna and the Wi-Fi antenna exceeding the first value. As described above, when the distance between the second antenna and the Wi-Fi antenna exceeds the first value (or when the second antenna and the Wi-Fi antenna are included in different antenna groups), the first indication may not be provided. Further, it will be appreciated by one of ordinary skill in the art that in the instant embodiment and other embodiments, refraining from providing the first indication may be replaced with providing the second indication as described above.

According to various embodiments, in operation 835, the communication processor 501 may provide information indicating that the first antenna among the plurality of antennas is used for transmission and is in communication inactive state. The first antenna may be, e.g., an antenna whose distance from the Wi-Fi antenna is the first value or less. For example, the communication processor 501 may change the antenna for RF signal transmission from the second antenna to the first antenna. In one example, the electronic device 101 may release the RRC connection based on the second antenna and may then camp on a particular cell, based on the first antenna. After camping on a specific cell, the electronic device 101 may be in a state prior to establishing an RRC connection with the specific cell. Or, in another example, the electronic device 101 may establish an RRC connection after changing the antenna for RF signal transmission from the second antenna to the first antenna and may then enter RRC idle state or RRC inactive state. Or, in another example, the electronic device 101 may establish an RRC connection after changing the antenna for RF signal transmission from the second antenna to the first antenna and may enter the C-DRX mode. The above-described examples in which the communication associated with the antenna is in an inactive state (e.g., RRC idle state, RRC inactive state, or C-DRX state) after changing the antenna for RF signal transmission are merely examples and are not limited.

In operation 837, the application processor 531 may refrain from providing the first indication based on communication inactivation, based on use and communication inactive state of the first antenna whose distance from the Wi-Fi antenna is the first value or less.

According to various embodiments, in operation 839, the communication processor 501 may provide information indicating that the first antenna among the plurality of antennas is used for transmission and is in communication active state. For example, the communication processor 501 may provide information indicating that among the plurality of antennas, the first antenna is used for transmission and is in communication active state based on entry into the RRC connected state or stopping of the C-DRX mode, but is not limited.

In operation 841, the application processor 531 may provide the first indication based on the distance between the first antenna and the Wi-Fi antenna being the first value or less and in communication active state.

In operation 843, the Wi-Fi module 533 may perform a back-off operation on the transmission power of Wi-Fi RF signal based on reception of the first indication.

In operation 845, the communication processor 501 may provide information indicating that the second antenna among the plurality of antennas is used for transmission and is in communication active state. For example, the distance between the second antenna and the Wi-Fi antenna may exceed the first value.

In operation 847, the application processor 531 may provide the second indication based on the distance between the second antenna and the Wi-Fi antenna exceeding the first value.

In operation 849, the Wi-Fi module 833 may stop a back-off operation on the transmission power of Wi-Fi RF signal based on reception of the second indication.

In various embodiments, the communication processor 501 may perform RRC connection release. The communication processor 501 may provide the application processor 531 with information associated with RRC connection release. The application processor 531 may provide the second indication to the Wi-Fi module 533 based on reception of the information associated with the RRC connection release. The Wi-Fi module 533 may stop the backoff operation based on the received communication inactivation information. Meanwhile, the communication processor 501 may then re-establish the RRC connection while maintaining the used antenna. The communication processor 501 may provide the application processor 531 with information associated with RRC connection establishment. The application processor 531 may provide the first indication to the Wi-Fi module 533 based on reception of the information associated with the RRC connection establishment. The Wi-Fi module 533 may perform the backoff operation based on the received communication inactivation information. Meanwhile, the communication processor 501 may provide the application processor 531 with information associated with antenna switching, TX hopping, and/or antenna change. The application processor 531 may provide the first indication or second indication to the Wi-Fi module 533 based on the received information.

Figure 8C:
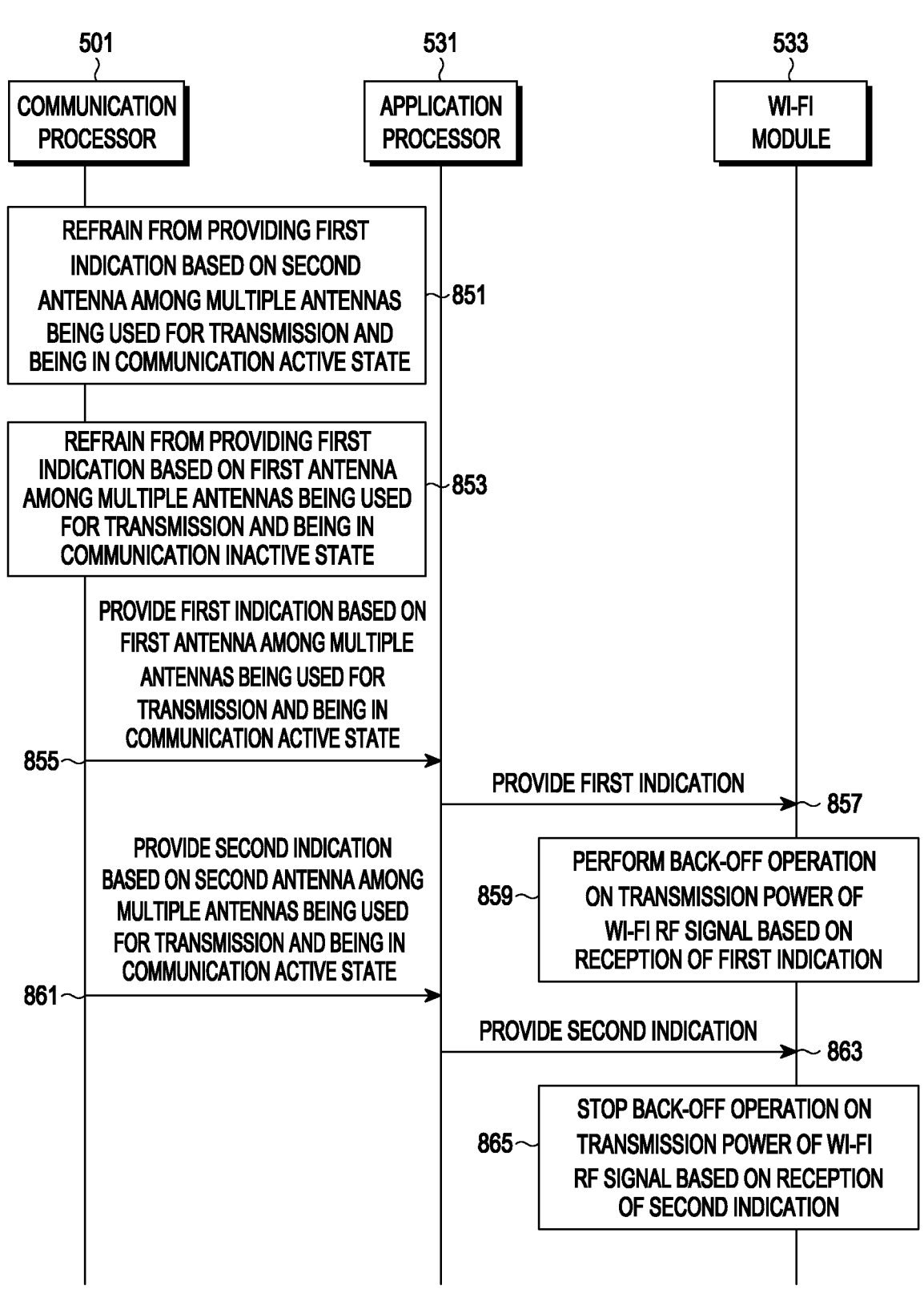
FIG. 8C is a signal flow diagram illustrating example operations of a communication processor, an application processor, and a Wi-Fi module according to various embodiments.

FIG. 8C is a signal flow diagram illustrating example operations of a communication processor, an application processor, and a Wi-Fi module according to various embodiments.

According to various embodiments, in operation 851, the communication processor 501 may refrain from providing the first indication based on the second antenna among the plurality of antennas being used for transmission and being in communication active state. For example, the distance between the second antenna and the Wi-Fi antenna may exceed the first value, and the communication processor 501 may refrain from providing the first indication.

In operation 853, the communication processor 501 may refrain from providing the first indication based on the first antenna among the plurality of antennas being used for transmission and being in communication inactive state. As described above, in the communication inactive state, it is not needed to perform backoff on the Wi-Fi RF signal, so that the communication processor 501 may refrain from providing the first indication based on the first antenna being used for transmission and being in the communication inactive state.

According to various embodiments, in operation 855, the communication processor 501 may provide the first indication based on the first antenna among the plurality of antennas being used for transmission and being in communication active state. For example, the communication processor 501 may provide the first indication by identifying that among the plurality of antennas, the first antenna is used for transmission and is in communication active state based on entry into the RRC connected state or stopping of the C-DRX mode, but is not limited.

In operation 857, the application processor 531 may provide the first indication to the Wi-Fi module 533.

In operation 859, the Wi-Fi module 533 may perform a back-off operation on the transmission power of Wi-Fi RF signal based on reception of the first indication.

In operation 861, the communication processor 501 may provide the second indication based on the second antenna among the plurality of antennas being used for transmission and being in communication active state. For example, the distance between the second antenna and the Wi-Fi antenna may exceed the first value.

In operation 863, the application processor 531 may provide the second indication to the Wi-Fi module 533.

In operation 865, the Wi-Fi module 833 may stop a back-off operation on the transmission power of Wi-Fi RF signal based on reception of the second indication.

Figure 9A:
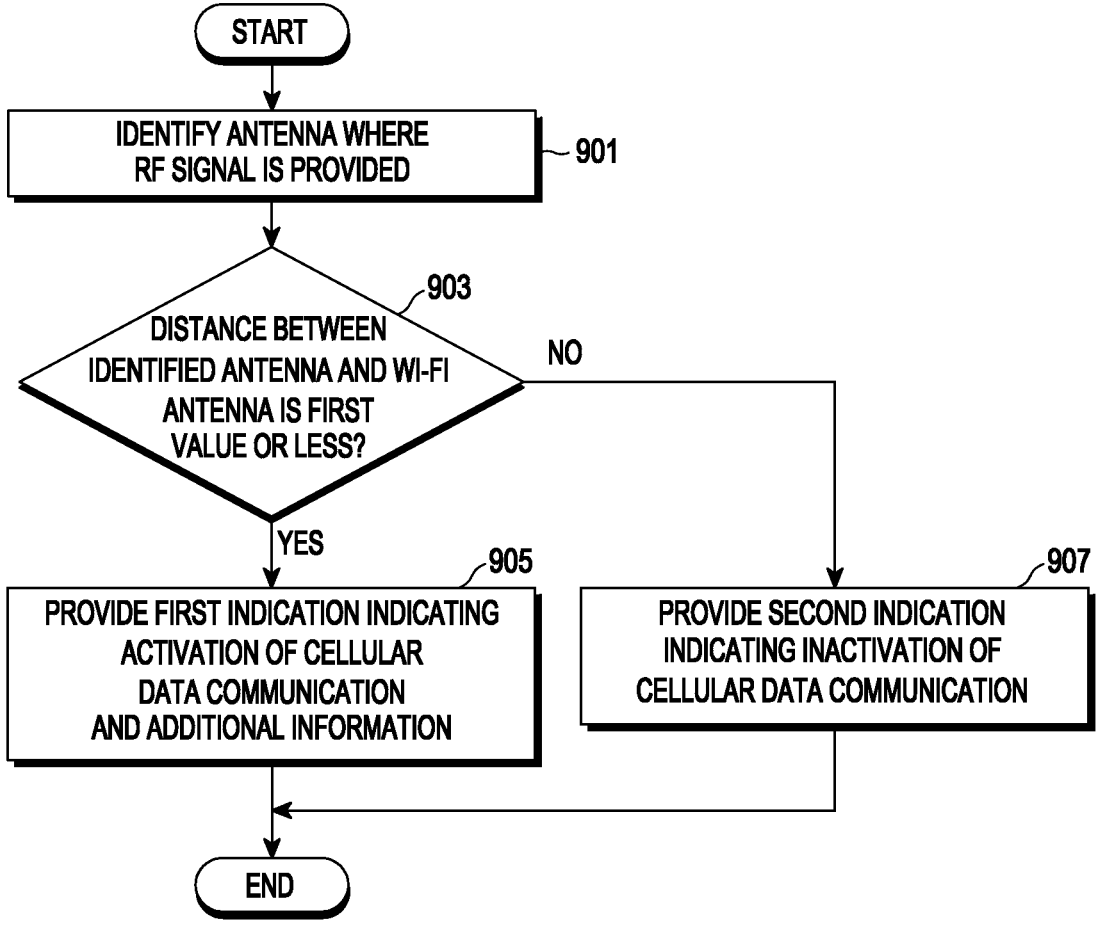
FIG. 9A is a flowchart illustrating example operations of an electronic device according to various embodiments.

FIG. 9A is a flowchart illustrating example operations of an electronic device according to various embodiments.

According to various embodiments, in operation 901, the electronic device 101 (e.g., the communication processor 501 and/or the application processor 531) may identify the antenna where an RF signal is provided.

In operation 903, the electronic device 101 may identify whether the distance between the identified antenna and the Wi-Fi antenna is the first value or less. As described above, the electronic device 101 may replace operation 903 to identify whether the identified antenna and the Wi-Fi antenna are included in the same antenna group. If the distance between the identified antenna and the Wi-Fi antenna is the first value or less (yes in 903), the electronic device 101 may provide the first indication indicating activation of cellular data communication and additional information in operation 905. In various embodiments, the additional information may include information for identifying the antenna, information for identifying the operating band, and/or duty rate, but is not limited. The additional information may be used to determine the backed-off maximum transmission power level and this is described below. If the distance between the identified antenna and the Wi-Fi antenna exceeds the first value (no in 903), the electronic device 101 may provide the second indication indicating inactivation of cellular data communication in operation 907. As described above, according to various embodiments, the electronic device 101 may provide additional information used to determine the backed-off maximum transmission power level along with the first indication leading to perform the back-off operation.

Figure 9B:
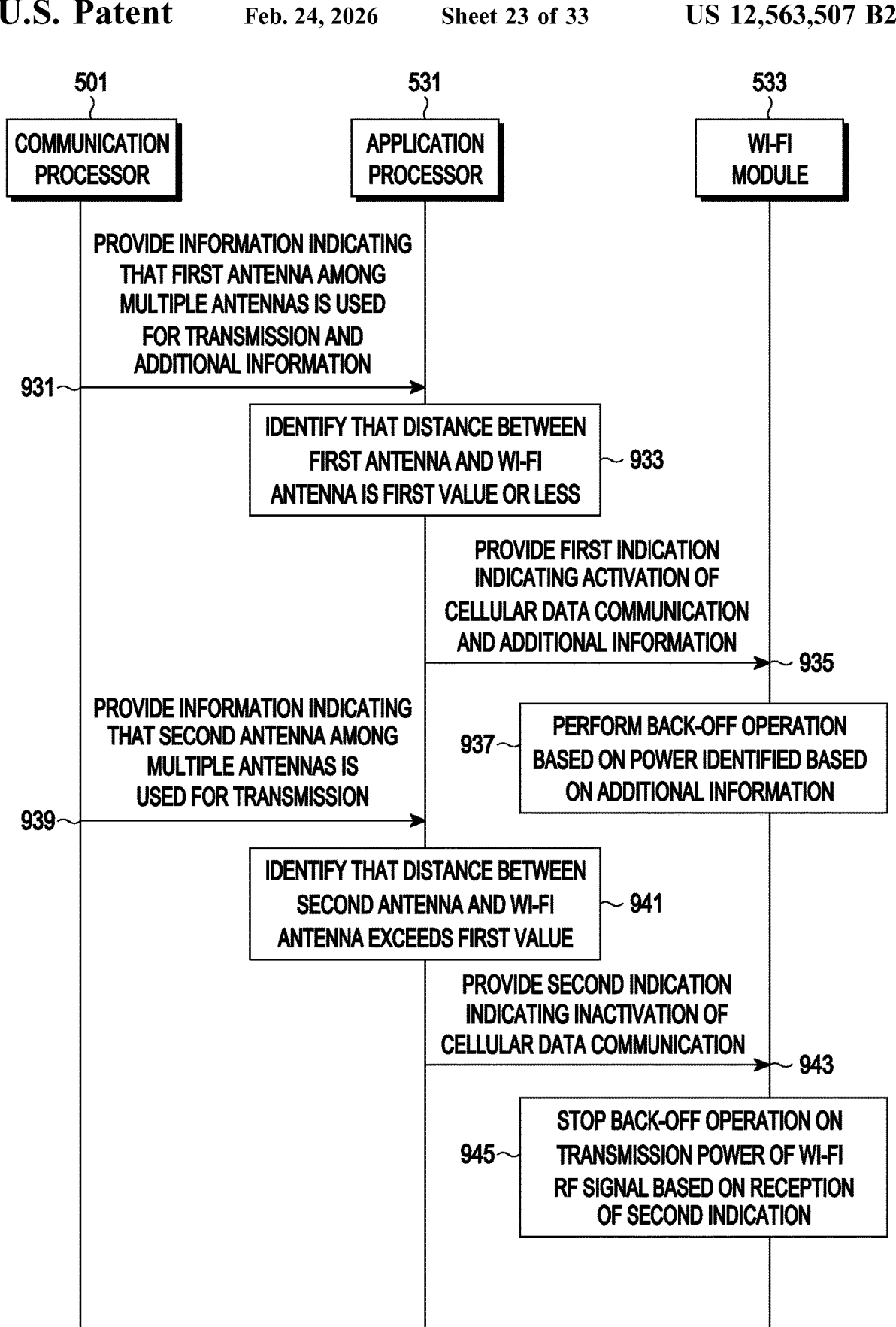
FIG. 9B is a signal flow diagram illustrating example operations of a communication processor, an application processor, and a Wi-Fi module according to various embodiments.

FIG. 9B is a signal flow diagram illustrating example operations of a communication processor, an application processor, and a Wi-Fi module according to various embodiments.

According to various embodiments, in operation 931, the communication processor 501 may provide information indicating that a first antenna among a plurality of antennas is used for transmission and additional information. For example, it is assumed that the distance between the first antenna and the Wi-Fi antenna is the first value or less. The additional information may include, e.g., information for identifying the antenna, information for identifying the operating band, and/or duty rate, but is not limited.

In operation 933, the application processor 531 may identify that the distance between the first antenna and the Wi-Fi antenna is the first value or less.

In operation 935, the application processor 531 may provide the first indication indicating activation of cellular data communication and additional information to the Wi-Fi module 533.

In operation 937, the Wi-Fi module 533 may perform a back-off operation based on the identified power based on the additional information. In an example, the Wi-Fi module 533 may identify the backed-off power based on the information for identifying the antenna. For example, Table 6 shows association information between backed-off maximum transmission power levels for example antennas for cellular data communication.

TABLE 6

| antenna for cellular data communication | backed-off maximum transmission power level |
|---|---|
| first antenna 521 | T1 |
| second antenna 522 | T2 |
| third antenna 523 | T3 |
| fourth antenna 524 | T4 |

The Wi-Fi module 533 may identify the backed-off maximum transmission power level corresponding to the antenna for cellular data communication to provide an RF signal by referencing the association information as shown in Table 6, for example.

In an example, the Wi-Fi module 533 may identify the backed-off power based on the information for identifying the operating band. For example, Table 7 shows association information between backed-off maximum transmission power levels for example operating bands

TABLE 7

| operating band | backed-off maximum transmission power level |
|---|---|
| at least one first operating band included in low band | T5 |
| at least one first operating band included in mid band | T6 |
| at least one first operating band included in high band | T7 |
| at least one first operating band included in ultra band | T8 |

The Wi-Fi module 533 may identify the backed-off maximum transmission power level corresponding to the operating band currently in use by referencing the association information as shown in Table 7, for example. Meanwhile, although Table 7 is described as being divided into four ranges, this is an example, and the dividing scheme is not limited.

According to various embodiments, the Wi-Fi module 533 may identify the backed-off maximum transmission power level using the association information of Table 6 and/or the association information of Table 7. It will be appreciated by one of ordinary skill in the art that when there are a plurality of maximum transmission power levels identified, the Wi-Fi module 533 selects the minimum value from among the plurality of maximum transmission power levels. Meanwhile, the association information of Tables 6 and 7 include the backed-off maximum transmission power level corresponding to the antenna and operating band, but this is merely an example. For example, the electronic device 101 may operate to meet the accumulated SAR rule as described above. In this case, it will be appreciated by one of ordinary skill in the art that the Wi-Fi module 533 may reduce the average SAR limit, and the backed-off maximum transmission power levels of Tables 6 and 7 may be implemented to be changed into the backed-off average SAR limit or the transmission power corresponding to the backed-off average SAR limit.

In an example, the Wi-Fi module 533 may identify the backed-off power based on the duty rate. For example, Table 8 shows association information between backed-off maximum transmission power levels for example antennas for cellular data communication.

TABLE 8

| duty rate | transmission power corresponding to average SAR limit |
|---|---|
| X1% or less | T9 |
| more than X1%, and X2% or less | T10 |
| more than X2%, and X3% or less | T11 |
| more than X3% | T12 |

The Wi-Fi module 533 may identify the transmission power corresponding to the average SAR limit corresponding to the duty rate, as the backed-off maximum transmission power level corresponding to the antenna for cellular data communication, by referencing the association information as shown in Table 8, for example. For example, as the duty rate decreases, the degree of backoff may reduce (or the transmission power corresponding to the average SAR limit may increase), but is not limited. For example, the electronic device 101 may operate to meet the accumulated SAR rule as described above. In this case, the Wi-Fi module 533 may reduce the average SAR limit and reference the association information including the transmission power corresponding to the average SAR limit as shown in Table 8.

As described above, the Wi-Fi module 533 may determine to perform the back-off operation based on the first indication and identify the backed-off maximum transmission power level based on the additional information.

According to various embodiments, in operation 939, the communication processor 501 may provide information indicating that the second antenna among a plurality of antennas is used for transmission. It is assumed that the distance between the second antenna and the Wi-Fi antenna exceeds the first value.

In operation 941, the application processor 531 may identify that the distance between the second antenna and the Wi-Fi antenna exceeds the first value.

In operation 943, the application processor 531 may provide the second indication indicating inactivation of cellular data communication.

In operation 945, the Wi-Fi module 533 may stop a back-off operation on the transmission power of Wi-Fi RF signal based on reception of the second indication.

Figure 9C:
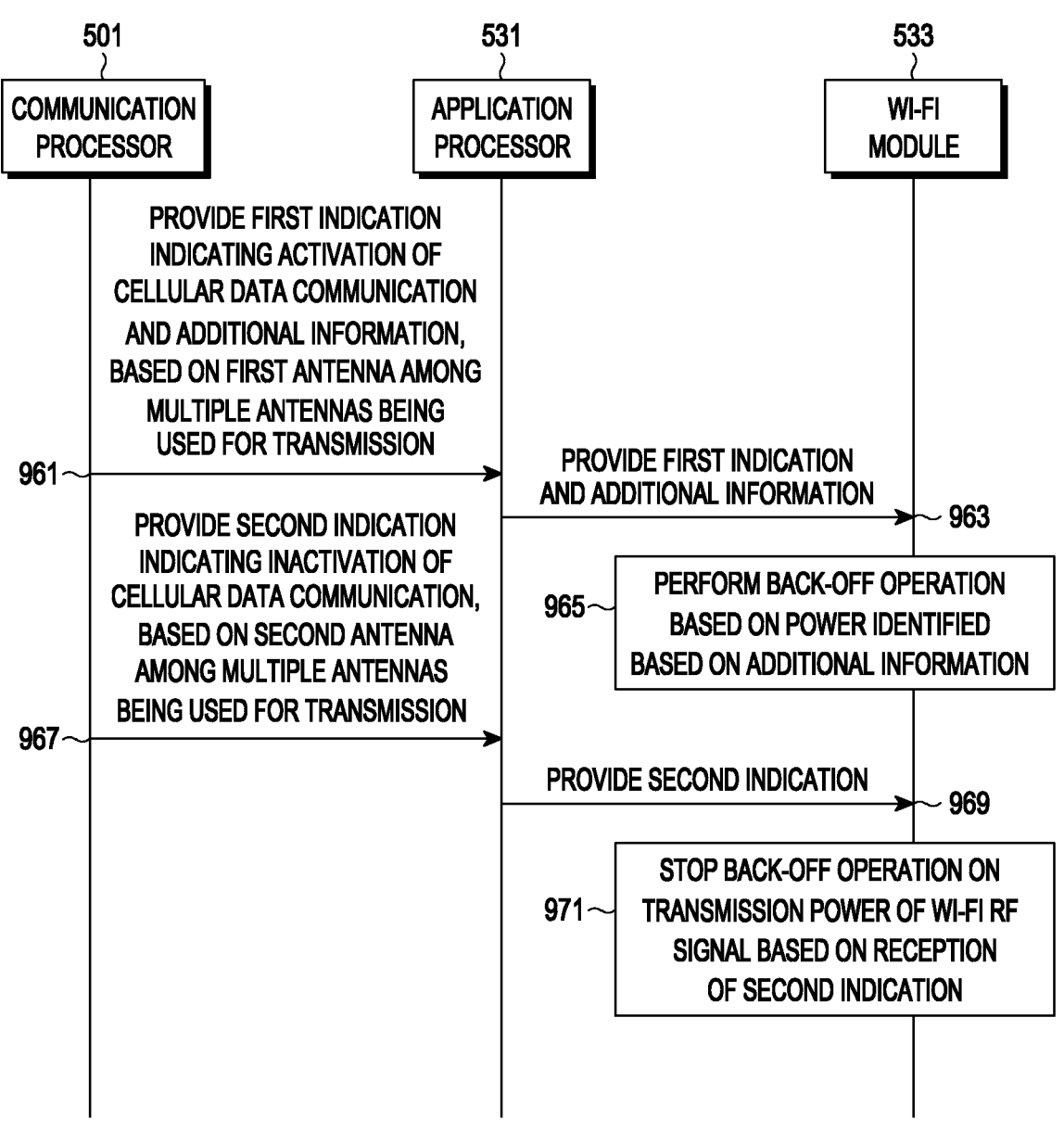
FIG. 9C is a signal flow diagram illustrating example operations of a communication processor, an application processor, and a Wi-Fi module according to various embodiments.

FIG. 9C is a signal flow diagram illustrating example operations of a communication processor, an application processor, and a Wi-Fi module according to various embodiments.

According to various embodiments, in operation 961, the communication processor 501 may provide the first indication and additional information based on the first antenna among the plurality of antennas being used for transmission.

In operation 963, the application processor 531 may provide the first indication and additional information to the Wi-Fi module 533.

In operation 965, the Wi-Fi module 533 may perform a back-off operation based on the identified power based on the additional information. For example, the identification of the backed-off maximum transmission power level based on additional information has been described above in connection with FIG. 9B, and no repeated description thereof is thus given below.

In operation 967, the communication processor 501 may provide the second indication based on the second antenna among the plurality of antennas being used for transmission.

In operation 969, the application processor 531 may provide the second indication to the Wi-Fi module 533.

In operation 971, the Wi-Fi module 533 may stop a back-off operation on the transmission power of Wi-Fi RF signal based on reception of the second indication.

Figure 10:
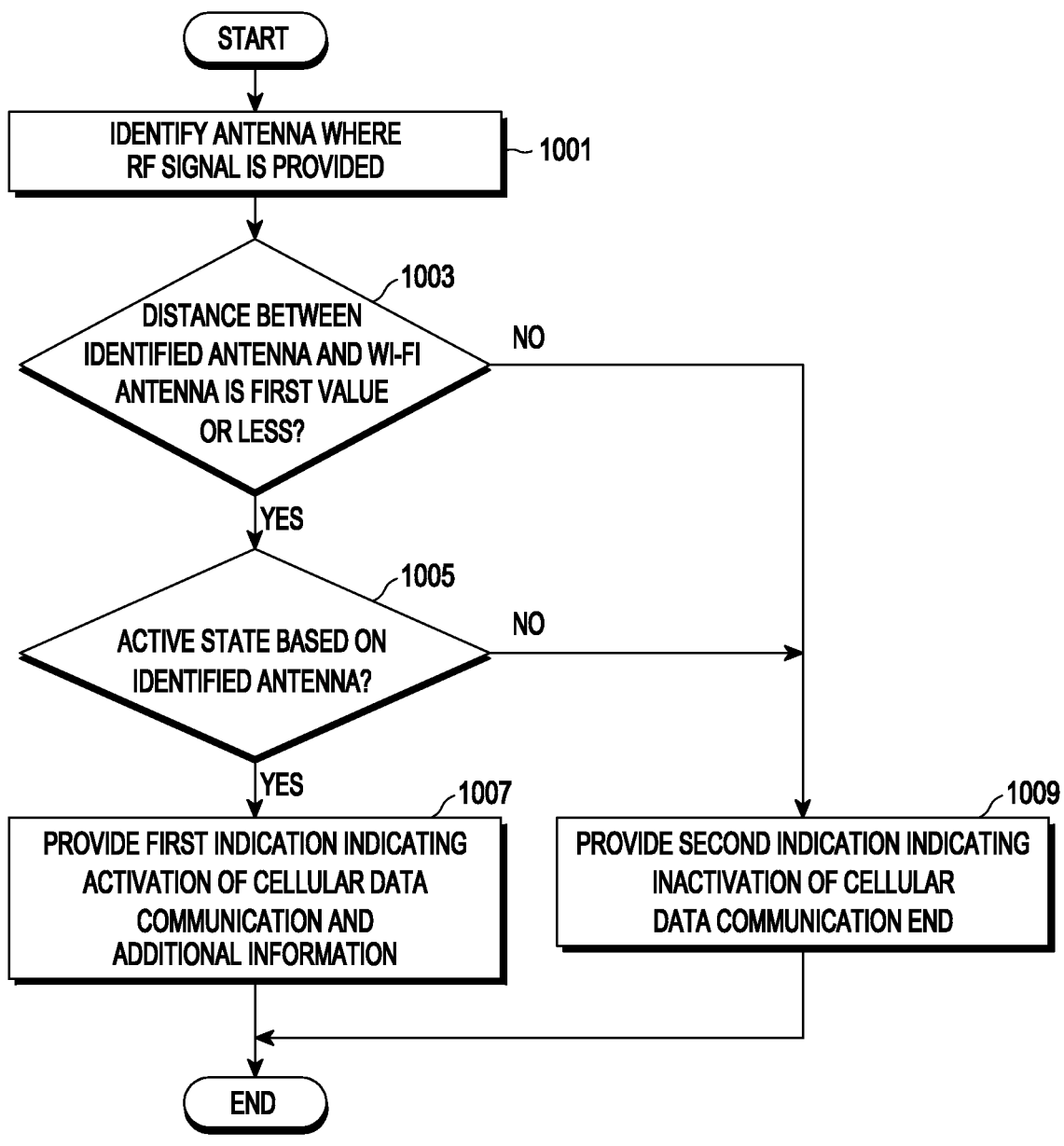
FIG. 10 is a flowchart illustrating example operations of an electronic device according to various embodiments.

FIG. 10 is a flowchart illustrating example operations of an electronic device according to various embodiments.

According to various embodiments, in operation 1001, the electronic device 101 (e.g., the communication processor 501 and/or the application processor 531) may identify the antenna where an RF signal is provided.

In operation 1003, the electronic device 101 may identify whether the distance between the identified antenna and the Wi-Fi antenna is the first value or less. As described above, the electronic device 101 may replace operation 1003 to identify whether the identified antenna and the Wi-Fi antenna are included in the same antenna group. When the distance between the identified antenna and the Wi-Fi antenna is the first value or less (yes in 1003), the electronic device 101 may identify whether it is in the active state based on the identified antenna (e.g., RRC connected state or non-C-DRX mode state) in operation 1005. Upon identifying that it is in the active state based on the identified antenna (yes in 1005), the electronic device 101 may provide the first indication indicating activation of cellular data communication and additional information. If the distance between the identified antenna and the Wi-Fi antenna exceeds the first value (no in 1003), the electronic device 101 may provide the second indication indicating inactivation of cellular data communication in operation 1009. If it is not in the active state based on the identified antenna (no in 1005), the electronic device 101 may provide the second indication indicating inactivation of cellular data communication in operation 1009.

Figure 11:
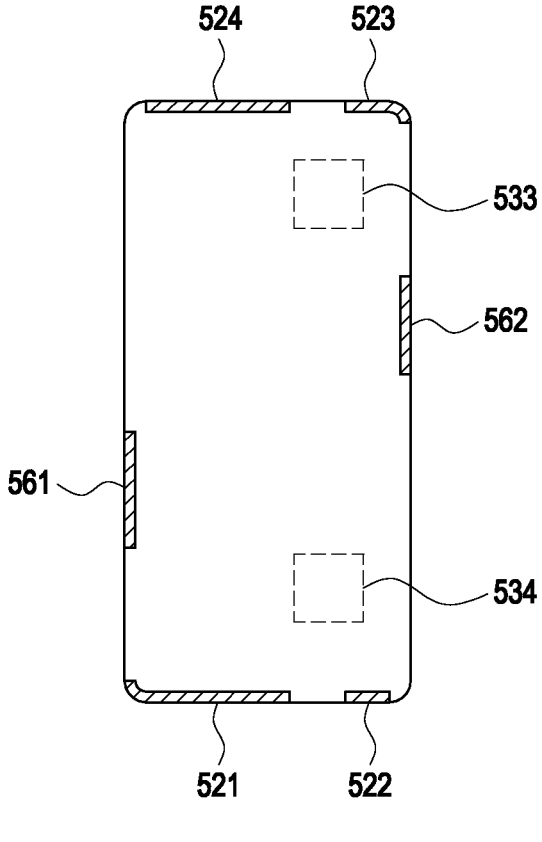
FIG. 11 is a diagram illustrating an example of an electronic device including a plurality of Wi-Fi modules according to various embodiments.

FIG. 11 is a diagram illustrating an example of an electronic device including a plurality of Wi-Fi modules according to various embodiments.

According to various embodiments, the electronic device 101 may further include an additional Wi-Fi module (e.g., including Wi-Fi circuitry) 534 disposed apart from the Wi-Fi module 533. The additional Wi-Fi module 534 may be connected with (or include) at least one Wi-Fi antenna. The Wi-Fi module 534 may be an RF module for processing, e.g., Wi-Fi-based RF signals. In an example, any one of the Wi-Fi modules 533 and 534 may include a Wi-Fi modem and an RF module, and the other may be implemented to include an RF module. In this case, the signal from the Wi-Fi modem included in one Wi-Fi module may be processed by both the Wi-Fi modules 533 and 534. Or, in another example, each of the Wi-Fi modules 533 and 534 may be implemented to include a Wi-Fi modem and an RF module. The Wi-Fi module 533 may be disposed on a relatively upper side, and the additional Wi-Fi module 534 may be disposed on a relatively lower side. For example, at least one Wi-Fi antenna of the Wi-Fi module 533 may be included in the same antenna group as the third antenna 523 or the fourth antenna 524. Accordingly, when the third antenna 523 or the fourth antenna 524 is used to provide an RF signal, the Wi-Fi module 533 may perform a backoff operation. When the first antenna 521 or the second antenna 522 is used to provide an RF signal, the Wi-Fi module 533 may refrain from performing a backoff operation. For example, at least one Wi-Fi antenna of the additional Wi-Fi module 534 may be included in the same antenna group as the first antenna 521 or the second antenna 522. Accordingly, when the third antenna 523 or the fourth antenna 524 is used to provide an RF signal, the additional Wi-Fi module 534 may refrain from performing a backoff operation. When the first antenna 521 or the second antenna 522 is used to provide an RF signal, the additional Wi-Fi module 534 may perform a backoff operation.

Figure 12:
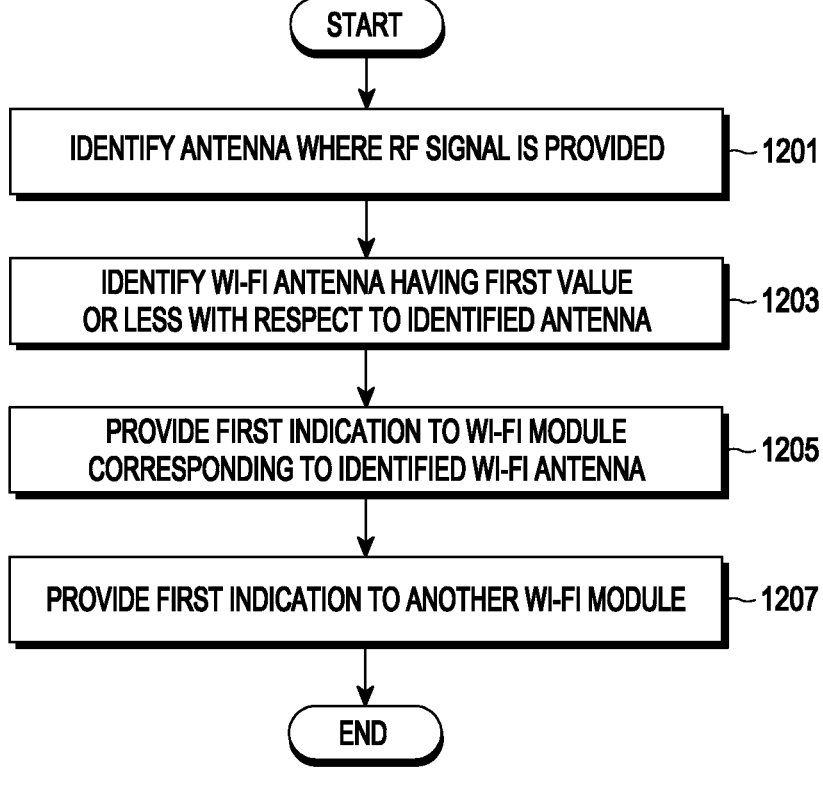
FIG. 12 is a flowchart illustrating example operations of an electronic device according to various embodiments.

FIG. 12 is a flowchart illustrating example operations of an electronic device according to various embodiments.

According to various embodiments, in operation 1201, the electronic device 101 (e.g., the communication processor 501 and/or the application processor 531) may identify the antenna where an RF signal is provided.

In operation 1203, the electronic device 101 may identify a Wi-Fi antenna (or Wi-Fi module) having a first value or less with respect to the identified antenna. Or, the electronic device 101 may identify a Wi-Fi antenna (Wi-Fi module) included in the same antenna group as the identified antenna. The electronic device 101 may identify the Wi-Fi antenna (or Wi-Fi module) having the first value or less with respect to the identified antenna by referencing the association information between the Wi-Fi antennas (or Wi-Fi modules) and the antennas for cellular data communication. Or, the electronic device 101 may identify the Wi-Fi antenna (or Wi-Fi module) included in the same antenna group as the identified antenna by referencing information about at least one antenna for cellular data communication and/or at least one Wi-Fi antenna included in the antenna group.

In operation 1205, the electronic device 101 may provide the first indication to the Wi-Fi module corresponding to the identified Wi-Fi antenna. Referring to FIG. 11, upon identifying that the first antenna 521 is used, the communication processor 501 and/or the application processor 531 may provide the first indication to the additional Wi-Fi module 534 included in the same antenna group as the first antenna 521 in operation 1207. Accordingly, the additional Wi-Fi module 534 may perform a back-off operation. The Wi-Fi module 533 not receiving the first indication may not perform a back-off operation. Upon identifying that the third antenna 523 is used, the communication processor 501 and/or the application processor 531 may provide the first indication to the Wi-Fi module 533 included in the same antenna group as the third antenna 523. Accordingly, the Wi-Fi module 533 may perform a back-off operation. The additional Wi-Fi module 534 not receiving the first indication may not perform a back-off operation.

In various examples, the backed-off maximum transmission power levels of the Wi-Fi module 533 and the additional Wi-Fi module 534 may be set to differ from each other. However, this is an example, and the backed-off maximum transmission power levels of both the Wi-Fi modules 533 and 534 may be set to be the same. Table 9 shows example backed-off maximum transmission power levels of the Wi-Fi module 533 and the additional Wi-Fi module 534.

TABLE 9

| | N66 (first antenna) | N41 (first antenna) 33% | N41 (first antenna) 25% | N78 (second antenna) 25% |
|---|---|---|---|---|
| maximum transmission power level of Wi-Fi module 533 | 16 dBm | 17 dBm | 18 dBm | 19 dBm |

TABLE 9-continued

| | N66 (first antenna) | N41 (first antenna) 33% | N41 (first antenna) 25% | N78 (second antenna) 25% |
|---|---|---|---|---|
| maximum transmission power level of additional Wi-Fi module 534 | 20 dBm | 20 dBm | 20 dBm | 20 dBm |

N66, N41, and N78 in Table 9 may refer, for example, to operating bands. Antenna identification information may be reflected in parentheses. The number expressed with % may refer, for example, to the duty rate.

Figure 13A:
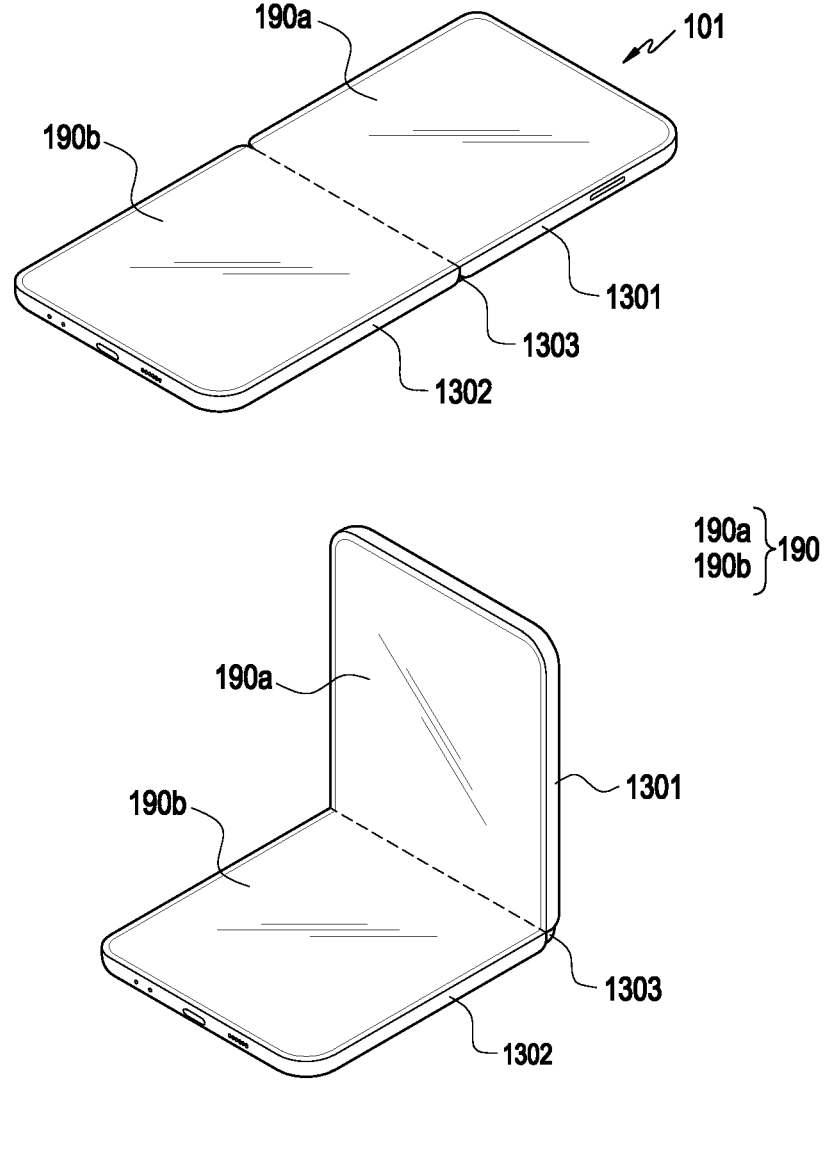
FIG. 13A includes perspective views illustrating a change in the state of a housing of an electronic device according to various embodiments.

FIG. 13A includes various perspective views illustrating a change in the state of a housing of an electronic device according to various embodiments. The embodiment of FIG. 13A is described with reference to FIGS. 13B and 13C. FIGS. 13B and 13C are diagrams illustrating a distance between antennas according to various embodiments.

According to various embodiments, the electronic device 101 may include a first housing 1301, a second housing 1302, a hinge structure 1303, and a display module 190. A first portion 190a of the display module 190 may be seated in the first housing 1301 (or visually exposed (e.g., visible) through an opening formed by the first housing 1301), and a second portion 190b of the display module 190 may be seated in the second housing 1302 (or visually exposed (e.g., visible) through an opening formed by the second housing 1302). At least a portion of the first portion 190a and at least a portion of the second portion 190b may be flexible. Further, the hinge structure 1303 may include a mechanical structure to allow the first housing 1301 to rotate relative to the second housing 1302. In the left-side embodiment of FIG. 13A, the state of at least one housing (e.g., the first housing 1301 and the second housing 1302) may be represented as a first state (e.g., fully unfolded state). In the first state, the first portion 190a of the display module 190 and the second portion 190b of the display module 190 may face in substantially the same direction. FIG. 13B illustrates antennas in the state of at least one housing (e.g., the first housing 1301 and the second housing 1302) is the first state (e.g., fully unfolded state). For example, in the first state, the first antenna 1321, the second antenna 1322, and the third antenna 1323 may be included in the first antenna group 1331. For example, as the distance between the first antenna 1321 and the second antenna 1322 is a threshold distance (e.g., a threshold distance according to Equation 1 set based on the sum SAR) or less, the distance between the second antenna 1322 and the third antenna 1323 is the threshold distance or less, and the distance between the first antenna 1321 and the third antenna 1323 is the threshold distance or less, the first antenna 1321, the second antenna 1322, and the third antenna 1323 may be included in the first antenna group 1331. Meanwhile, in the first state, the fourth antenna 1311, the fifth antenna 1312, and the sixth antenna 1313 may be included in the second antenna group 1332. For example, as the distance between the fourth antenna 1311 and the fifth antenna 1312 is the threshold distance or less, the distance between the fifth antenna 1312 and the sixth antenna 1313 is the threshold distance or less, and the distance between the fourth antenna 1311 and the sixth antenna 1313 is the threshold distance or less, the fourth antenna 1311, the fifth antenna 1312, and the sixth antenna 1313 may be included in the second antenna group 1332. Meanwhile, the distance between the third antenna 1323 included in the first antenna group 1331 and the sixth antenna 1313 included in the second antenna group 1332 may be the shortest distance among the distances between the respective antennas of the different antenna groups 1331 and 1332. The distance between the third antenna 1323 and the sixth antenna 1313 may exceed the threshold distance. Accordingly, when two RF signals are transmitted through at least one antenna among the antennas 1321, 1322, and 1323 included in the first antenna group 1331, the electronic device 101 needs to observe the SAR rule based on the sum of the RF exposure of the first RF signal and the RF exposure of the second RF signal according to being 2TX based on the same antenna group. At least some of the antennas 1311, 1312, 1313, 1321, 1322, and 1323 may be used for cellular data communication, and remaining some may be used for Wi-Fi communication. For example, when the antenna used for cellular data communication and the antenna used for Wi-Fi communication are included in the same antenna group, the Wi-Fi module may perform a back-off operation.

Meanwhile, the first housing 1301 may rotate relative to the second housing 1302 in which case at least a portion of the display module 190 may be folded. In the middle embodiment of FIG. 13A, the state of at least one housing (e.g., the first housing 1301 and the second housing 1302) may be represented as a second state (e.g., a state different from the first state and/or the third state). The second state is a state different from the first state and/or the third state. For example, the angle (or relative position) between the housings 1301 and 1302 may differ from the angle (or relative position) between the housings 1301 and 1302 in the first state and/or third state. The second state is an intermediate state between the unfolded state and the folded state and may be referred to as, e.g., a half-folded state or a transition state. Further, the first housing 1301 may further rotate relative to the second housing 1302 in which case at least a portion of the display module 190 may be further folded. In the right-side embodiment of FIG. 13A, the state of at least one housing (e.g., the first housing 1301 and the second housing 1302) may be represented as a third state (e.g., folded state). In the third state, the first portion 190a of the display module 190 and the second portion 190b of the display module 190 may substantially face each other. FIG. 13C illustrates antennas in the state of at least one housing (e.g., the first housing 1301 and the second housing 1302) is the third state (e.g., folded state). In this case, all of the distances between two pairs of the antennas 1311, 1312, 1313, 1321, 1322, and 1323 may be the threshold distance or less. For example, in the first state, the third antenna 1323 and the sixth antenna 1313 are included in different antenna groups, but in the third state, the third antenna 1323 and the sixth antenna 1313 may be included in the same group. Accordingly, when the first RF signal is provided using the third antenna 1323, and the second RF signal is provided using the sixth antenna 1313 in the third state, it is required to observe the SAR rule based on the sum of the RF exposure of the first RF signal and the RF exposure of the second RF signal according to being 2TX based on the same antenna group. As described above, the criterion for determining whether to back off may be dynamically changed depending on the state (e.g., shape) of the housing and, according to various embodiments, the electronic device 101 may determine whether to back off the maximum transmission power level based on the state of the housing. For example, in the changed housing state, when the antenna used for cellular data communication and the antenna used for Wi-Fi communication are included in the same antenna group, the Wi-Fi module may perform a back-off operation.

Figure 13A:
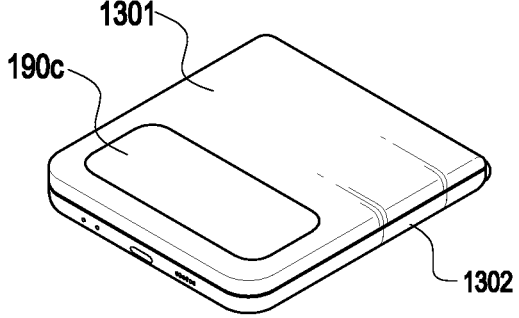
Figures 13B, 13C:
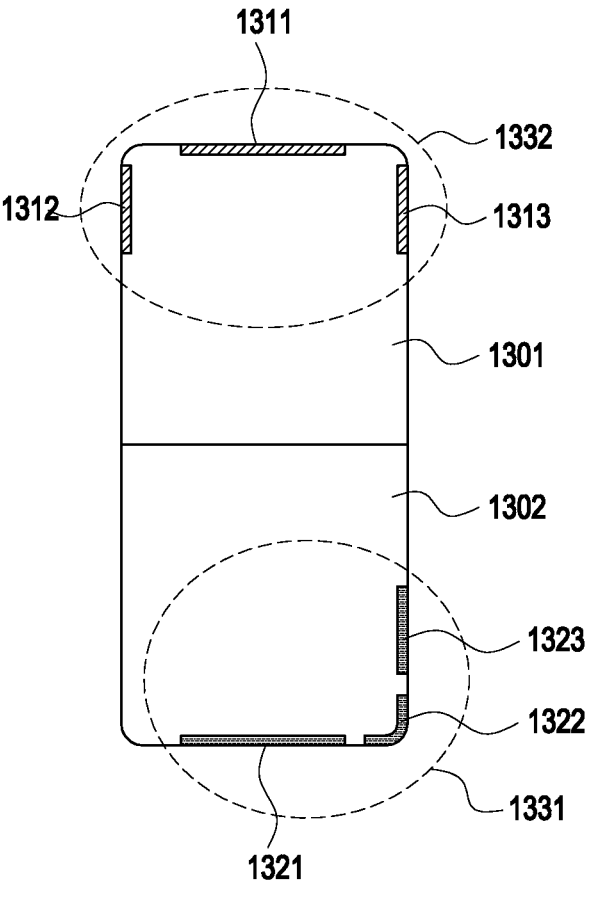
FIGS. 13B and 13C are diagrams illustrating a distance between antennas according to various embodiments.

Meanwhile, it will be appreciated by one of ordinary skill in the art that the foldable device described in connection with FIG. 13 is merely an example, and in various embodiments, is not limited as long as it is a device (e.g., slidable device) having a transformable housing.

Figure 14:
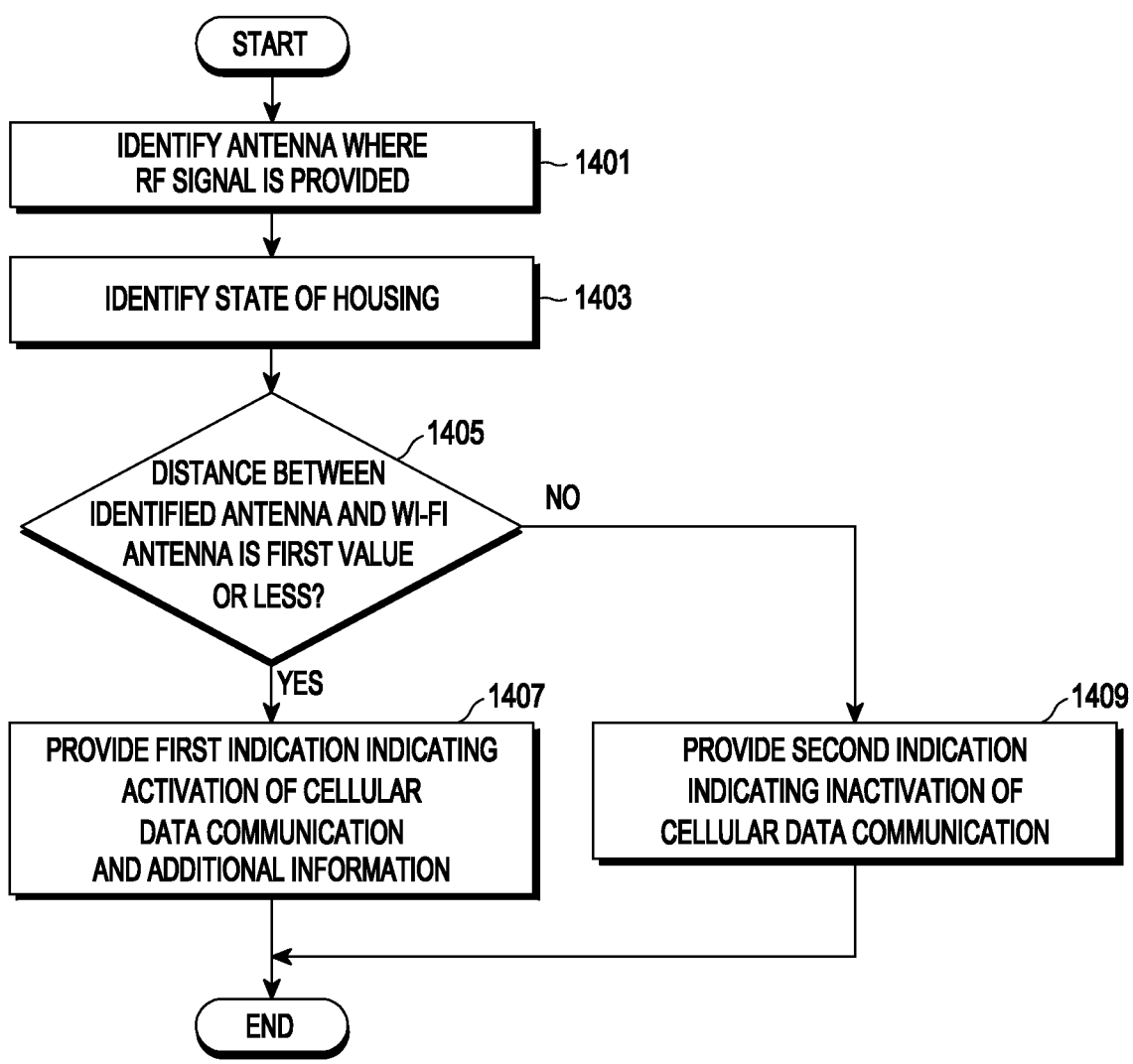
FIG. 14 is a flowchart illustrating example operations of an electronic device according to various embodiments.

FIG. 14 is a flowchart illustrating example operations of an electronic device according to various embodiments.

According to various embodiments, in operation 1401, the electronic device 101 (e.g., the communication processor 501 and/or the application processor 531) may identify the antenna where an RF signal is provided.

In operation 1403, the electronic device 101 may identify the state of the housing.

In operation 1405, the electronic device 101 may identify whether the distance between the identified antenna and the Wi-Fi antenna is the first value or less (or whether they are included in the same antenna group). The electronic device 101 may identify whether the distance between the identified antenna and the Wi-Fi antenna in the identified housing state is the first value or less (or whether they are included in the same antenna group). The electronic device 101 may identify whether the distance between the identified antenna and the Wi-Fi antenna in the identified housing state is the first value or less (or whether they are included in the same antenna group) by referencing association information about the distance between the Wi-Fi antenna and the antenna for cellular data communication for each of a plurality of designated housing states (or association information about whether they are included in the same antenna group). Or, the electronic device 101 may identify (e.g., calculate) the distance between the identified antenna and the Wi-Fi antenna based on the identified housing state and identify that the identified distance is the first value or less. If the distance between the identified antenna and the Wi-Fi antenna is the first value or less (yes in 1405), the electronic device 101 may provide the first indication indicating activation of cellular data communication and additional information in operation 1407. If the distance between the identified antenna and the Wi-Fi antenna exceeds the first value (no in 1405), the electronic device 101 may provide the second indication indicating inactivation of cellular data communication in operation 1409. For example, it is assumed that in FIG. 13A, the antenna 1313 is used for Wi-Fi communication, and the antenna 1321 is used for cellular data communication. In the first state (e.g., fully unfolded state), the distance between the antenna 1313 and the antenna 1321 may exceed the first value, and the electronic device 101 may provide the second indication to the Wi-Fi module. In this case, the Wi-Fi module may not perform a back-off operation. In the third state (e.g., folded state), the distance between the antenna 1313 and the antenna 1321 may be the first value or less, and the electronic device 101 may provide the first indication to the Wi-Fi module. In this case, the Wi-Fi module may perform a back-off operation.

Figure 15A:
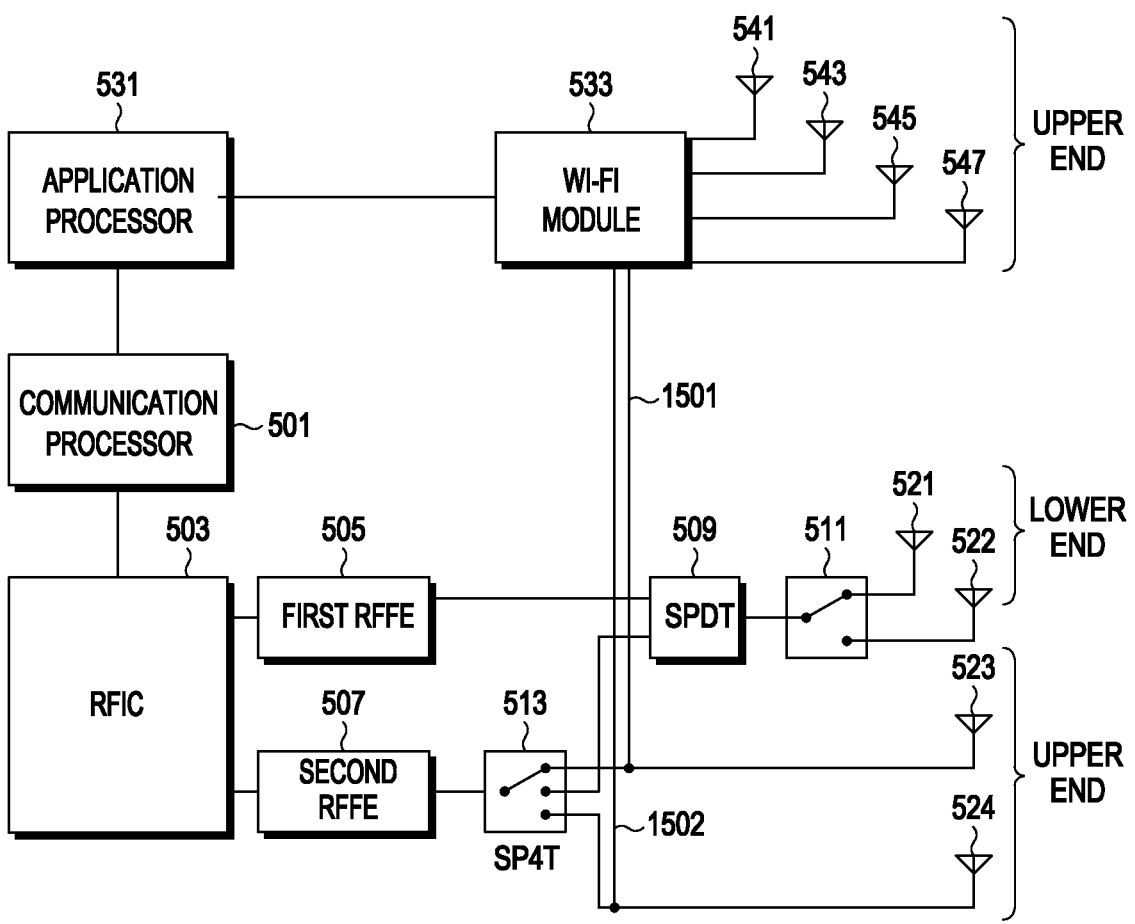
FIG. 15A is a block diagram illustrating an example configuration of an electronic device according to various embodiments.
Figure 15B:
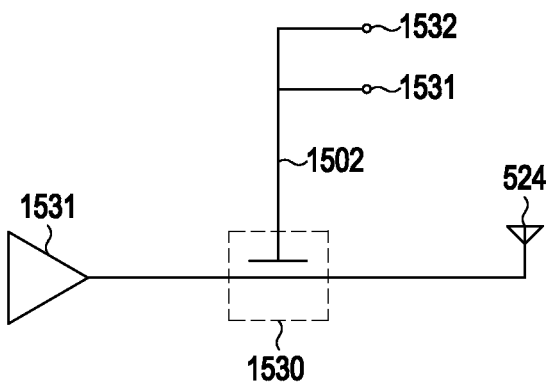
FIG. 15B is a diagram illustrating a coupler according to various embodiments.

FIG. 15A is a block diagram illustrating an example configuration of an electronic device according to various embodiments. The embodiment of FIG. 15A is described with reference to FIG. 15B. FIG. 15B is a diagram illustrating a coupler according to various embodiments.

Referring to FIG. 15A, the Wi-Fi module 533 and the third antenna 523 may be connected by a first line 1501. The Wi-Fi module 533 and the fourth antenna 524 may be connected through a second line 1502. As described above, the third antenna 523 and the Wi-Fi antenna connected to (or included in) the Wi-Fi module 533 may be included in the same antenna group, and the fourth antenna 524 and the Wi-Fi antenna connected to (or included in) the Wi-Fi module 533 may be included in the same antenna group. The lines 1501 and 1502 may be connected to the antennas (e.g., the third antenna 523 and the fourth antenna 524) included in the same antenna group as the Wi-Fi antenna connected to (or included in) the Wi-Fi module 533. For example, referring to FIG. 15B, an amplifier 1531 may be connected to the fourth antenna 524. A coupler 1530 may be connected between the amplifier 1531 and the antenna 524, and the coupler 1530 may be connected to two output terminals 1531 and 1532. The output terminal 1531 may be connected to, e.g., an RFIC. The output terminal 1532 may be connected to, e.g., the Wi-Fi module 533. Accordingly, the Wi-Fi module 533 may identify whether to provide an RF signal to the fourth antenna 524 based on the signal provided through the output terminal 1532.

Figure 16:
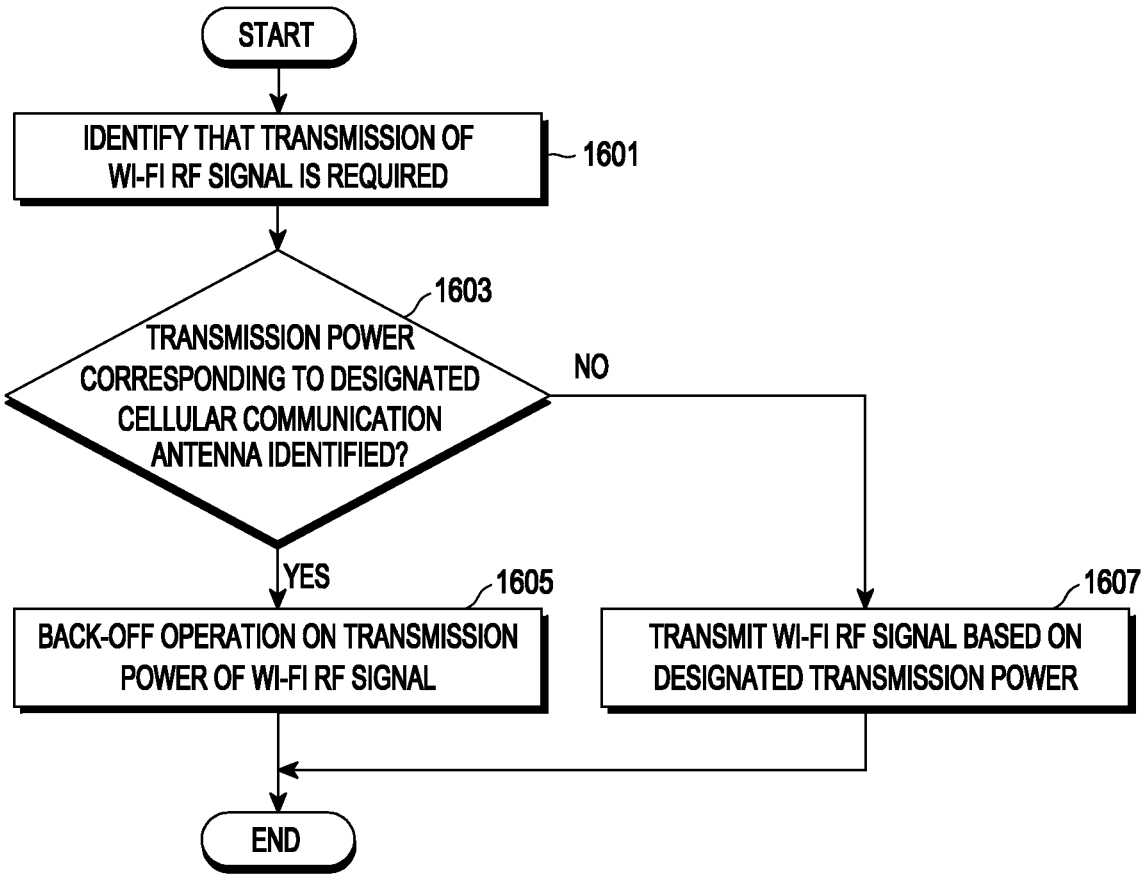
FIG. 16 is a flowchart illustrating example operations of a Wi-Fi module according to various embodiments.

FIG. 16 is a flowchart illustrating example operations of a Wi-Fi module according to various embodiments.

According to various embodiments, in operation 1601, the Wi-Fi module 533 may identify that transmission of a Wi-Fi RF signal is required.

In operation 1603, the Wi-Fi module 533 may identify whether transmission power corresponding to a designated cellular communication antenna is identified. For example, the Wi-Fi module 533 may identify whether transmission power corresponding to the designated cellular communication antenna is identified based on whether there is an output from the output terminal 1532 in FIG. 15B. For example, when the magnitude (at least one of voltage, current, or power) measured at the output terminal 1532 is a threshold magnitude or more, the Wi-Fi module 533 may determine that the transmission power corresponding to the designated cellular communication antenna is identified. Upon identifying the transmission power corresponding to the designated cellular communication antenna (yes in 1603), the Wi-Fi module 533 may perform a back-off operation on the transmission power of the Wi-Fi RF signal in operation 1605. When the transmission power corresponding to the designated cellular communication antenna is not identified (no in 1603), the Wi-Fi module 533 may transmit a Wi-Fi RF signal based on the designated transmission power in operation 1607. The Wi-Fi module 533 may not perform a back-off operation.

According to various example embodiments, an electronic device (e.g., the electronic device 101) may comprise an RF circuit (e.g., at least one of the first RFIC 222, the second RFIC 224, the third RFIC 226, or the fourth RFIC 228, the first RFFE 232, the second RFFE 234, the third RFFE 236, the RFIC 503, the first RFFE 505, the second RFFE 507, or switches 509, 511, and 513) configured for cellular data communication, a plurality of antennas (e.g., at least one of the first antenna module 242, the second antenna module 244, the third antenna module 246, or the antennas 521, 522, 523, and 524) connected to the RF circuit, a Wi-Fi module comprising Wi-Fi circuitry (e.g., the Wi-Fi module 533), and at least one processor (e.g., at least one of the processor 120, the first communication processor 212, the second communication processor 214, the integrated communication processor 260, the communication processor 501, or the application processor 531). The at least one processor may be configured to: provide a first indication indicating activation of cellular data communication based on a first antenna among the plurality of antennas being used for transmission, wherein a distance between the first antenna and a Wi-Fi antenna (e.g., at least one of the Wi-Fi antennas 541, 543, 545, and 547) corresponding to the Wi-Fi module may be equal to or less than a first value. The Wi-Fi module may be configured to: perform a back-off operation on transmission power of a Wi-Fi RF signal based on reception of the first indication. The at least one processor may be further configured to refrain from providing the first indication, based on a second antenna from which distance to the Wi-Fi antenna exceeds the first value among the plurality of antennas being used for transmission.

According to various example embodiments, the at least one processor may be further configured to provide a second indication indicating inactivation of cellular data communication, based on the second antenna from which distance to the Wi-Fi antenna exceeds the first value among the plurality of antennas being used for transmission.

According to various example embodiments, the Wi-Fi module may be further configured to stop performing the back-off operation, based on receiving the second indication while performing the back-off operation.

According to various example embodiments, the at least one processor may be configured to, as at least part of providing the first indication, provide the first indication, based on cellular communication associated with the first antenna being in an active state.

According to various example embodiments, the at least one processor may be further configured to refrain from providing the first indication, based on cellular communication associated with the first antenna being in an inactive state.

According to various example embodiments, the at least one processor may be configured to, as at least part of providing the first indication provide the first indication and additional information, and the additional information may include information for identifying the first antenna, information about an operating band associated with the first antenna, and/or information about a duty rate.

According to various example embodiments, the Wi-Fi module may be further configured to determine at least one transmission power corresponding to a maximum average specific absorption rate (SAR) allocated for the Wi-Fi communication and/or a maximum transmission power level of the Wi-Fi RF signal, based on the additional information.

According to various example embodiments, the electronic device may further comprise an additional Wi-Fi module comprising Wi-Fi circuitry (e.g., the Wi-Fi module 534). The at least one processor may be further configured to refrain from providing the first indication to the additional Wi-Fi module, based on the first antenna being used for transmission, and a distance between the first antenna and an additional Wi-Fi antenna corresponding to the additional Wi-Fi module exceeding the first value.

According to various example embodiments, the at least one processor may be further configured to identify the distance between the first antenna and the Wi-Fi antenna corresponding to the Wi-Fi module and/or identify whether the distance between the first antenna and the Wi-Fi antenna corresponding to the Wi-Fi module is equal to or less than the first value.

According to various example embodiments, the at least one processor may be configured to, as at least part of identifying the distance between the first antenna and the Wi-Fi antenna corresponding to the Wi-Fi module, identify the distance, based on a sensing value of at least one parameter changed according to a state of a housing of the electronic device and/or a change in the state of the housing.

According to various example embodiments, the Wi-Fi module may be configured to, as at least part of performing the back-off operation on the transmission power of the Wi-Fi RF signal based on reception of the first indication, reduce a maximum transmission power level of the Wi-Fi RF signal and/or reduce at least one transmission power corresponding to a maximum average SAR allocated for the Wi-Fi communication.

According to various example embodiments, the at least one processor may include at least one communication processor and at least one application processor. The at least one communication processor may be configured to provide information for identifying the first antenna to the at least one application processor. The at least one application processor may be configured to provide the first indication to the Wi-Fi module, based on reception of the information for identifying the first antenna.

According to various example embodiments, a method for operating an electronic device may comprise: providing a first indication indicating activation of cellular data communication based on a first antenna among a plurality of antennas of the electronic device being used for transmission by at least one processor of the electronic device, wherein a distance between the first antenna and a Wi-Fi antenna corresponding to the Wi-Fi module may be equal to or less than a first value. The method for operating the electronic device may comprise performing a back-off operation on transmission power of a Wi-Fi RF signal based on reception of the first indication by a Wi-Fi module of the electronic device. Providing the first indication may be refrained from, based on a second antenna from which distance to the Wi-Fi antenna exceeds the first value among the plurality of antennas being used for transmission.

According to various example embodiments, the method for operating the electronic device may further comprise providing, by the at least one processor, a second indication indicating inactivation of cellular data communication, based on the second antenna from which distance to the Wi-Fi antenna exceeds the first value among the plurality of antennas being used for transmission.

According to various example embodiments, the method for operating the electronic device may further comprise stopping, by the Wi-Fi module, performing the back-off operation, based on receiving the second indication while performing the back-off operation.

According to various example embodiments, in the method for operating the electronic device, in the providing the first indication, the first indication may be provided, based on cellular communication associated with the first antenna being in an active state.

According to various example embodiments, the method for operating the electronic device may further comprise refraining, by the at least one processor, from providing the first indication, based on the cellular communication associated with the first antenna being in an inactive state.

According to various example embodiments, the method for operating the electronic device may further comprise providing, by the at least one processor, the first indication and additional information, as at least part of providing the first indication. The additional information may include information for identifying the first antenna, information about an operating band associated with the first antenna, and/or information about a duty rate.

According to various example embodiments, the method for operating the electronic device may further comprise determining, by the Wi-Fi module, at least one transmission power corresponding to a maximum average SAR allocated for the Wi-Fi communication and/or a maximum transmission power level of the Wi-Fi RF signal, based on the additional information.

According to various example embodiments, the method for operating the electronic device may further comprise refraining, by the at least one processor, from providing the first indication to the additional Wi-Fi module, based on the first antenna being used for transmission, and a distance between the first antenna and an additional Wi-Fi antenna corresponding to the additional Wi-Fi module included in the electronic device exceeding the first value.

According to various example embodiments, the method for operating the electronic device may further comprise identifying, by the at least one processor, the distance between the first antenna and the Wi-Fi antenna corresponding to the Wi-Fi module and/or identifying whether the distance between the first antenna and the Wi-Fi antenna corresponding to the Wi-Fi module is equal to or less than the first value.

According to various example embodiments, identifying the distance between the first antenna and the Wi-Fi antenna corresponding to the Wi-Fi module may identify the distance, based on a sensing value of at least one parameter changed according to a state of a housing of the electronic device and/or a change in the state of the housing.

According to various example embodiments, performing the back-off operation on the transmission power of the Wi-Fi RF signal based on reception of the first indication may reduce a maximum transmission power level of the Wi-Fi RF signal and/or reduce at least one transmission power corresponding to a maximum average SAR allocated for the Wi-Fi communication.

According to various example embodiments, the at least one processor may include at least one communication processor and at least one application processor. The at least one communication processor may provide information for identifying the first antenna to the at least one application processor. The at least one application processor may provide the first indication to the Wi-Fi module, based on reception of the information for identifying the first antenna.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be understood by those skilled in the art that various changes in form and detail may be made without departing from the true spirit and full scope of the disclosure including the appended claims and their equivalents. It will also be understood that any of the embodiment(s) described herein may be used in conjunction with any other embodiment(s) described herein.

What is claimed is:

1. An electronic device comprising:
a radio frequency (RF) circuit configured for cellular data communication;
a plurality of antennas connected to the RF circuit;
a Wi-Fi module comprising Wi-Fi circuitry; and
at least one processor comprising processing circuitry; and
a memory storing instructions which, when executed individually and/or collectively by the at least one processor, controls the electronic device to:
provide to the Wi-Fi module, based on a first antenna among the plurality of antennas being used for transmission of a cellular data communication, a first indication indicating activation of the cellular data communication, wherein a distance between the first antenna and a Wi-Fi antenna corresponding to the Wi-Fi module is equal to or less than a first value,
wherein the Wi-Fi module is configured to perform, based on reception of the first indication, a back-off operation on transmission power of a Wi-Fi RF signal, and
wherein the at least one processor is further configured to refrain, based on a distance between a second antenna, among the plurality of antennas being used for transmission of a cellular data communication, and the Wi-Fi antenna exceeding the first value, from providing the first indication to the Wi-Fi module.

2. The electronic device of claim 1, wherein the memory stores instructions which, when executed individually and/or collectively by the at least one processor, controls the electronic device to provide, based on the second antenna from which the distance to the Wi-Fi antenna exceeds the first value among the plurality of antennas being used for transmission, a second indication indicating inactivation of cellular data communication.

3. The electronic device of claim 2, wherein the Wi-Fi module is further configured to stop, based on receiving the second indication while performing the back-off operation, performing the back-off operation.

4. The electronic device of claim 1, wherein the memory stores instructions which, when executed individually and/or collectively by the at least one processor, controls the electronic device to, as at least part of providing the first indication, provide the first indication based on cellular communication associated with the first antenna being in an active state.

5. The electronic device of claim 4, wherein the memory stores instructions which, when executed individually and/or collectively by the at least one processor, controls the electronic device to refrain, based on cellular communication associated with the first antenna being in an inactive state, from providing the first indication.

6. The electronic device of claim 1, wherein the memory stores instructions which, when executed individually and/or collectively by the at least one processor, controls the electronic device to, as at least part of providing the first indication, provide the first indication and additional information, and wherein the additional information includes information for identifying the first antenna, information about an operating band associated with the first antenna, and/or information about a duty rate.

7. The electronic device of claim 6, wherein the Wi-Fi module is further configured to determine at least one transmission power corresponding to a maximum average specific absorption rate (SAR) allocated for the Wi-Fi communication and/or a maximum transmission power level of the Wi-Fi RF signal, based on the additional information.

8. The electronic device of claim 1, further comprising an additional Wi-Fi module comprising Wi-Fi circuitry,
wherein the memory stores instructions which, when executed individually and/or collectively by the at least one processor, controls the electronic device to refrain from providing the first indication to the additional Wi-Fi module, based on the first antenna being used for transmission, and a distance between the first antenna and an additional Wi-Fi antenna corresponding to the additional Wi-Fi module exceeding the first value.

9. The electronic device of claim 1, wherein the memory stores instructions which, when executed individually and/or collectively by the at least one processor, controls the electronic device to identify the distance between the first antenna and the Wi-Fi antenna corresponding to the Wi-Fi module and/or identify whether the distance between the first antenna and the Wi-Fi antenna corresponding to the Wi-Fi module is equal to or less than the first value.

10. The electronic device of claim 9, wherein the memory stores instructions which, when executed individually and/or collectively by the at least one processor, controls the electronic device to, as at least part of identifying the distance between the first antenna and the Wi-Fi antenna corresponding to the Wi-Fi module, identify the distance, based on a sensing value of at least one parameter changed according to a state of a housing of the electronic device and/or a change in the state of the housing.

11. The electronic device of claim 1, wherein the Wi-Fi module is configured to, as at least part of performing the back-off operation on the transmission power of the Wi-Fi RF signal based on reception of the first indication, reduce a maximum transmission power level of the Wi-Fi RF signal and/or reduce at least one transmission power corresponding to a maximum average specific absorption rate (SAR) allocated for the Wi-Fi communication.

12. The electronic device of claim 1, wherein the at least one processor includes at least one communication processor and at least one application processor,
wherein the at least one communication processor is configured to provide information for identifying the first antenna to the at least one application processor, and
wherein the at least one application processor is configured to provide the first indication to the Wi-Fi module, based on reception of the information for identifying the first antenna.

13. The electronic device of claim 1, wherein the Wi-Fi module is configured to refrain from performing the back-off operation on the transmission power of the Wi-Fi RF signal when the distance between the second antenna and the Wi-Fi antenna exceeds the first value.

14. A method of operating an electronic device, the method comprising:

providing to a to the Wi-Fi module of the electronic device, based on a first antenna among a plurality of antennas of the electronic device being used for transmission of a cellular data communication by the electronic device, a first indication indicating activation of the cellular data communication, wherein a distance between the first antenna and a Wi-Fi antenna corresponding to the Wi-Fi module is equal to or less than a first value;

performing by the WiFi module, based on reception of the first indication by a Wi-Fi module of the electronic device, a back-off operation on transmission power of a Wi-Fi RF signal; and refraining, based on a distance between a second antenna, among the plurality of antennas being used for transmission of a cellular data communication, and the WiFi antenna exceeding the first value, from providing the first indication to the Wi-Fi module.

15. The method of claim 14, further comprising providing, by the at least one processor, based on the second antenna from which distance to the Wi-Fi antenna exceeds the first value among the plurality of antennas being used for transmission, a second indication indicating inactivation of cellular data communication.

16. The method of claim 15, further comprising stopping, by the Wi-Fi module, performing the back-off operation, based on receiving the second indication while performing the back-off operation.

17. The method of claim 14, wherein, in the providing the first indication, the first indication is provided based on cellular communication associated with the first antenna being in an active state, and wherein the providing the first indication is refrained from, based on the cellular communication associated with the first antenna being in an inactive state.

18. The method of claim 14, further comprising, as at least part of providing the first indication, providing, by the at least one processor, the first indication and additional information, and wherein the additional information includes information for identifying the first antenna, information about an operating band associated with the first antenna, and/or information about a duty rate.

19. The method of claim 18, further comprising determining, by the Wi-Fi module, based on the additional information, at least one transmission power corresponding to a maximum average specific absorption rate (SAR) allocated for the Wi-Fi communication and/or a maximum transmission power level of the Wi-Fi RF signal.

20. The method of claim 14, further comprising identifying, by the at least one processor, the distance between the first antenna and the Wi-Fi antenna corresponding to the Wi-Fi module and/or identifying whether the distance between the first antenna and the Wi-Fi antenna corresponding to the Wi-Fi module is equal to or less than the first value.

21. The method of claim 20, wherein identifying the distance between the first antenna and the Wi-Fi antenna corresponding to the Wi-Fi module identifies the distance, based on a sensing value of at least one parameter changed according to a state of a housing of the electronic device and/or a change in the state of the housing.

22. The method of claim 14, wherein the Wi-Fi module refrains from performing the back-off operation on the transmission power of the Wi-Fi RF signal when the distance between the second antenna and the Wi-Fi antenna exceeds the first value.

* * * * *